US008265146B2

(12) United States Patent
Nunomaki

(10) Patent No.: US 8,265,146 B2
(45) Date of Patent: Sep. 11, 2012

(54) INFORMATION PROCESSING APPARATUS, IMAGING DEVICE, INFORMATION PROCESSING METHOD, AND COMPUTER PROGRAM

(75) Inventor: Takashi Nunomaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1695 days.

(21) Appl. No.: 11/557,278

(22) Filed: Nov. 7, 2006

(65) Prior Publication Data

US 2007/0140662 A1 Jun. 21, 2007

(30) Foreign Application Priority Data

Nov. 8, 2005 (JP) ................ P2005-323364

(51) Int. Cl.
*H04N 11/02* (2006.01)
(52) U.S. Cl. .................. 375/240.12; 375/240.26
(58) Field of Classification Search ............ 375/240.12
See application file for complete search history.

(56) References Cited

U.S. PATENT DOCUMENTS

| | | | | |
|---|---|---|---|---|
| 7,071,974 | B2 * | 7/2006 | Tojo ............ | 348/222.1 |
| 7,574,104 | B2 * | 8/2009 | Sugano et al. ......... | 386/241 |
| 2001/0010523 | A1 * | 8/2001 | Sezan et al. ............ | 345/716 |
| 2004/0081429 | A1 | 4/2004 | Sugano et al. | |
| 2004/0239769 | A1 * | 12/2004 | Tojo .................. | 348/207.99 |

FOREIGN PATENT DOCUMENTS

| | | |
|---|---|---|
| EP | 1278135 | 1/2003 |
| JP | 02-032473 | 2/1990 |
| JP | 06-165009 | 10/1994 |
| JP | 10-326480 | 8/1998 |
| JP | 2002-176613 | 6/2002 |
| JP | 2004-222268 | 5/2004 |
| JP | 2004-254065 | 9/2004 |

OTHER PUBLICATIONS

An Office Action for Japanese Patent Application No. 2005-323364 issued on Aug. 19, 2008.
Japanese Office Action issued on Jun. 23, 2009 in connection with JP Application No. 2005-323364.
European Search Report issued on May 6, 2009 in connection with related European Patent Application No. 06023057.0.

* cited by examiner

*Primary Examiner* — David Czekaj
*Assistant Examiner* — Maria Vazquez Colon
(74) *Attorney, Agent, or Firm* — SNR Denton US LLP

(57) ABSTRACT

An information processing apparatus includes a data processor configured to execute processing for selecting a plurality of frame pictures from moving-picture data and for displaying an array of the selected frame pictures. In selecting frame pictures to be displayed, the data processor preferentially selects frame pictures corresponding to highlight points as frame pictures to be displayed, using highlight point information that allows identification of picture portions corresponding to important scenes, the highlight point information being recorded in association with the moving-picture data.

12 Claims, 20 Drawing Sheets

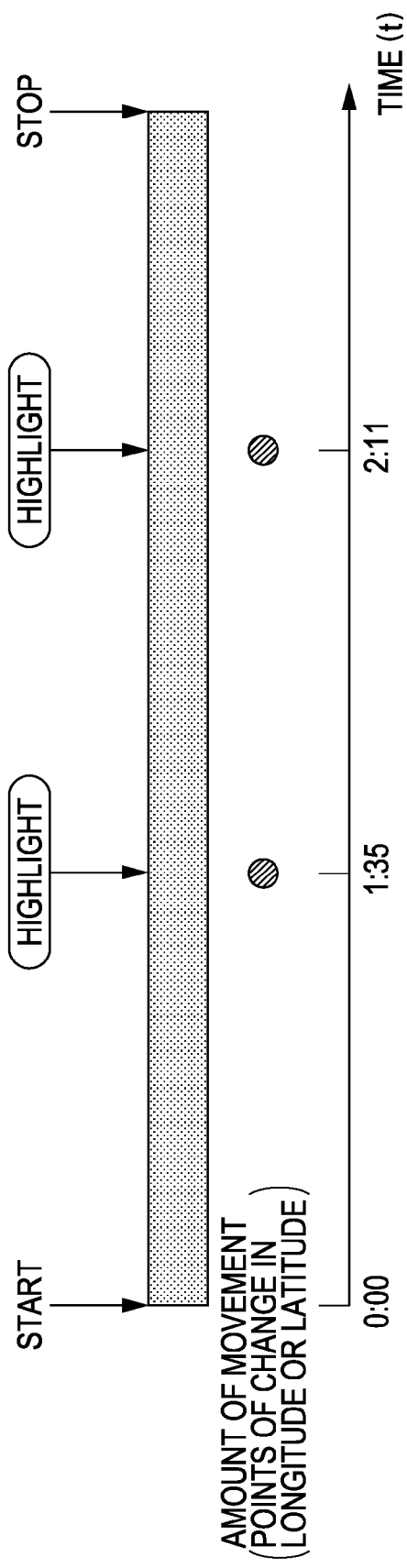
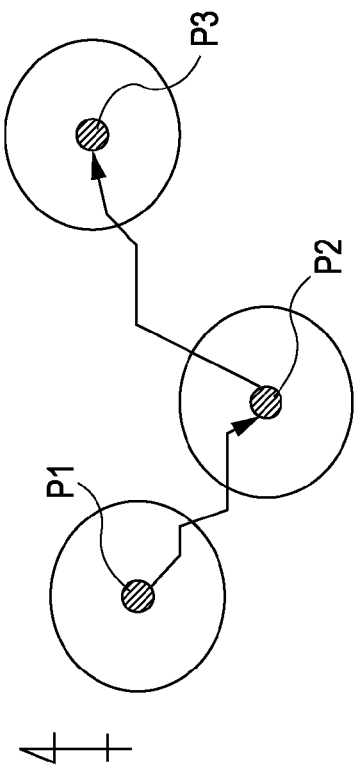

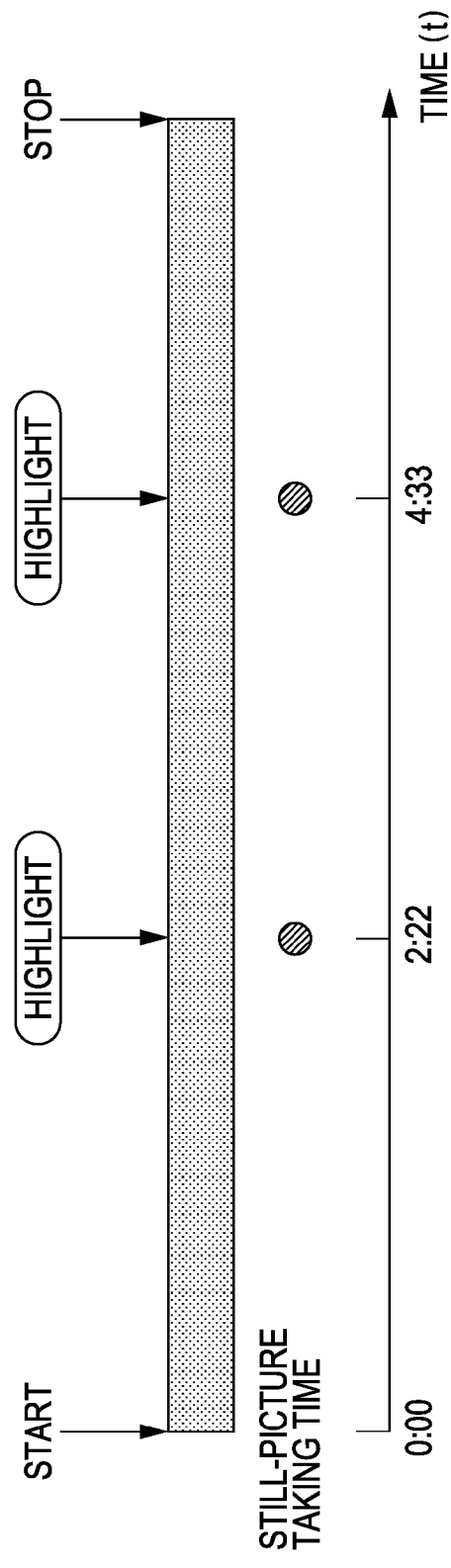

FIG. 15A

| RECORDING TIME | AMOUNT OF ZOOM CHANGE |
|---|---|
| 0:45 | 3.0 |
| 1:29 | -1.3 |
| 3:42 | 2.8 |

FIG. 15B

| RECORDING TIME | AMOUNT AND DIRECTION OF MOVEMENT |
|---|---|
| 0:52 | 5.0 |
| 1:46 | -2.8 |
| 3:01 | 3.0 |

FIG. 15C

| RECORDING TIME | PEAK AUDIO VALUE |
|---|---|
| 2:14 | 10 |
| 3:30 | 10 |
| 4:07 | 8 |

FIG. 15D

| RECORDING TIME | AMOUNT OF MOVEMENT |
|---|---|
| 1:35 | 10 |
| 2:11 | 15 |

FIG. 15E

| RECORDING TIME | TYPE OF CHANGE |
|---|---|
| 1:40 | YEAR CHANGE |

FIG. 15F

| RECORDING TIME |
|---|
| 2:22 |
| 4:33 |

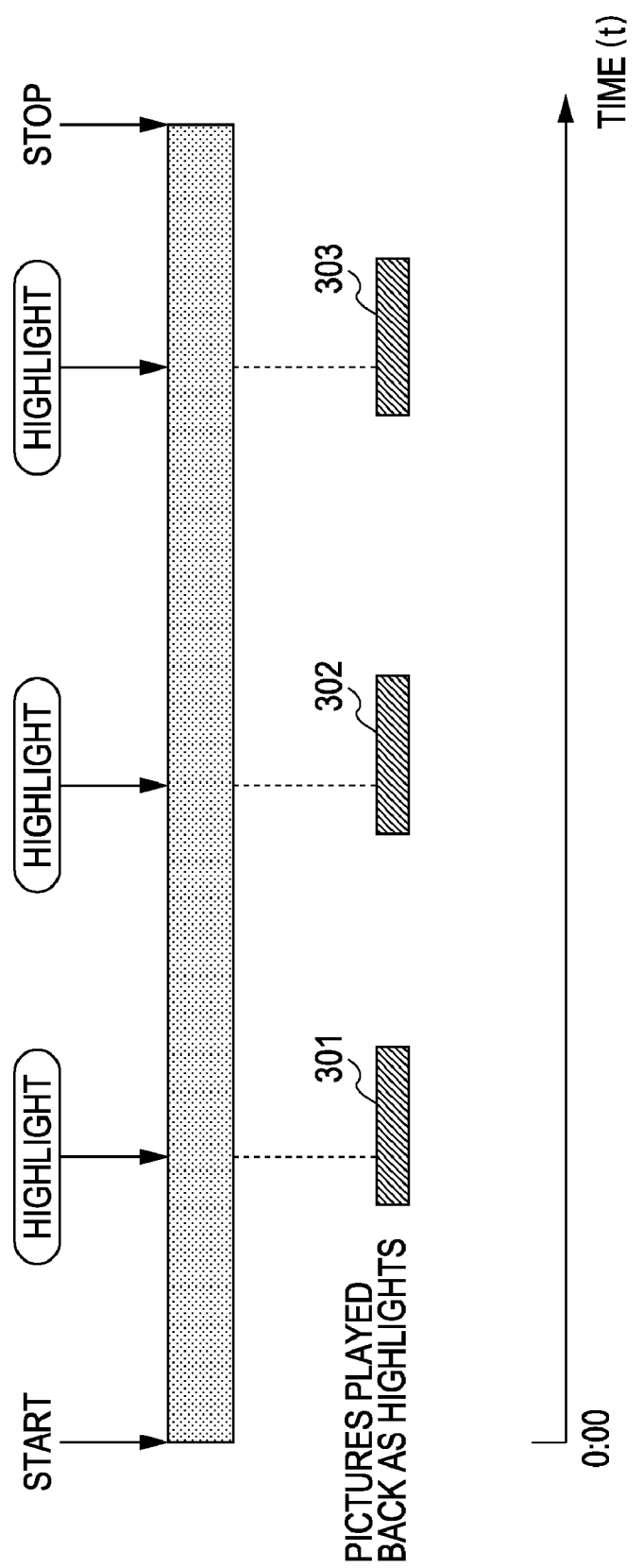

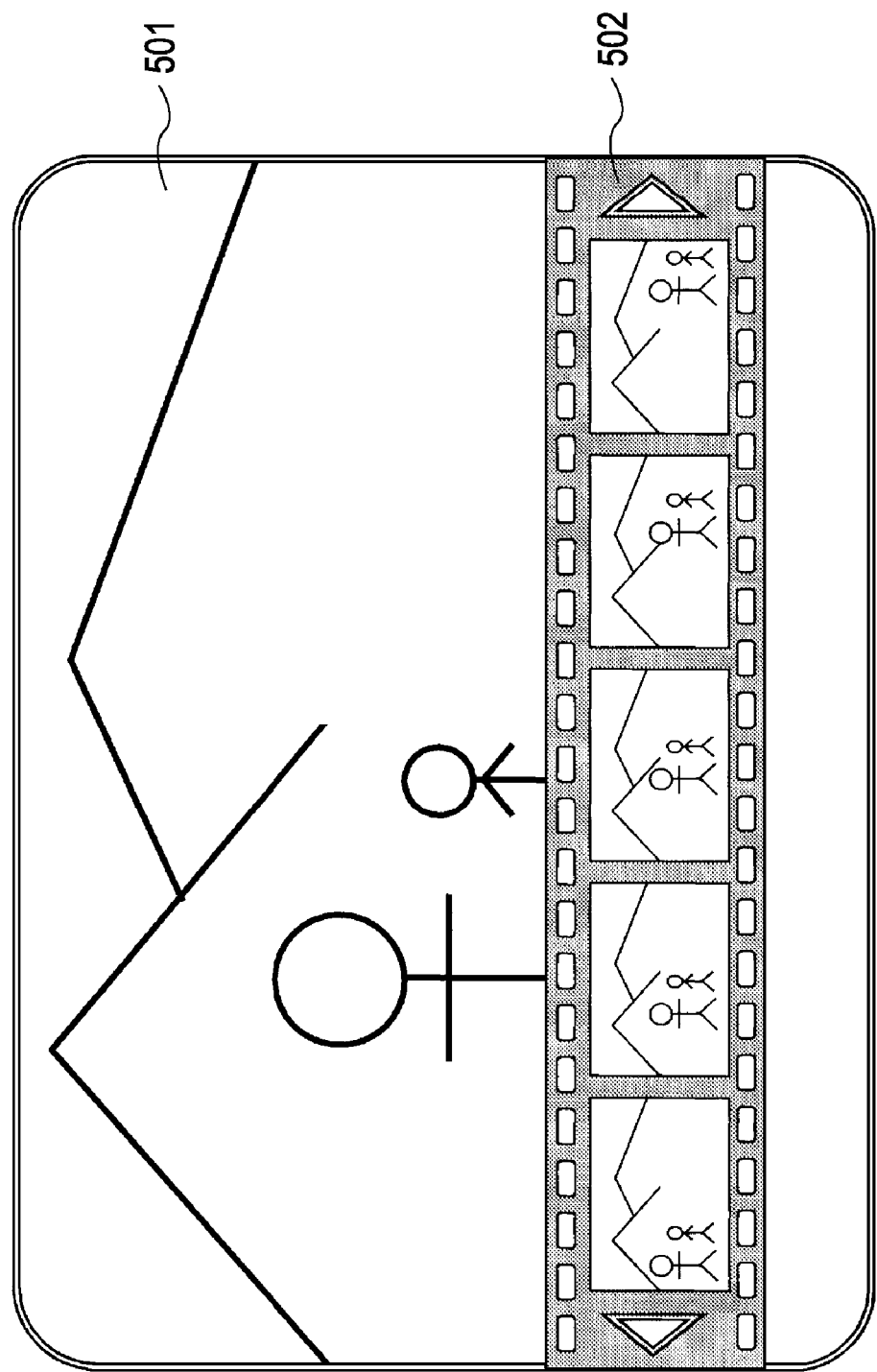

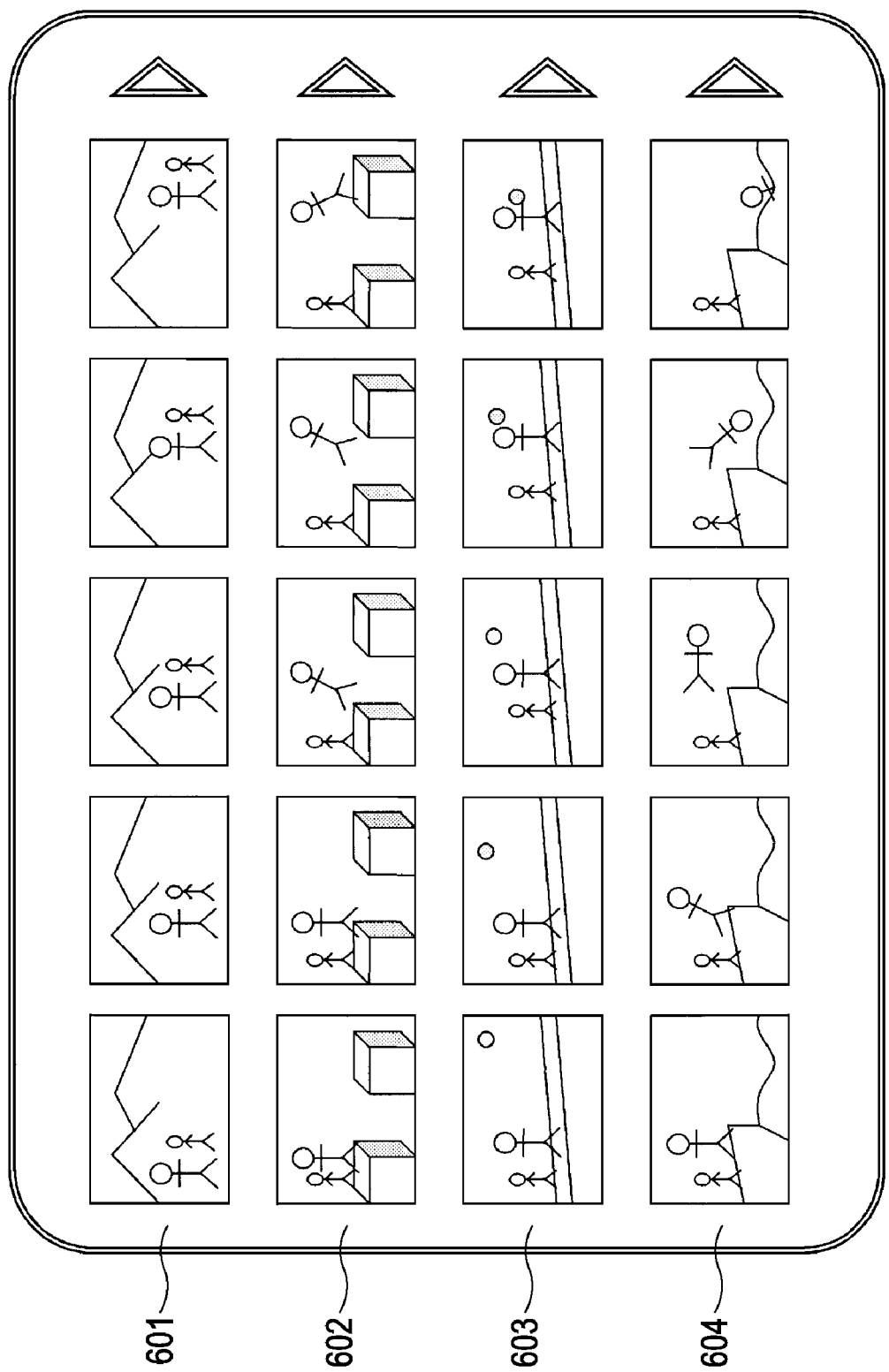

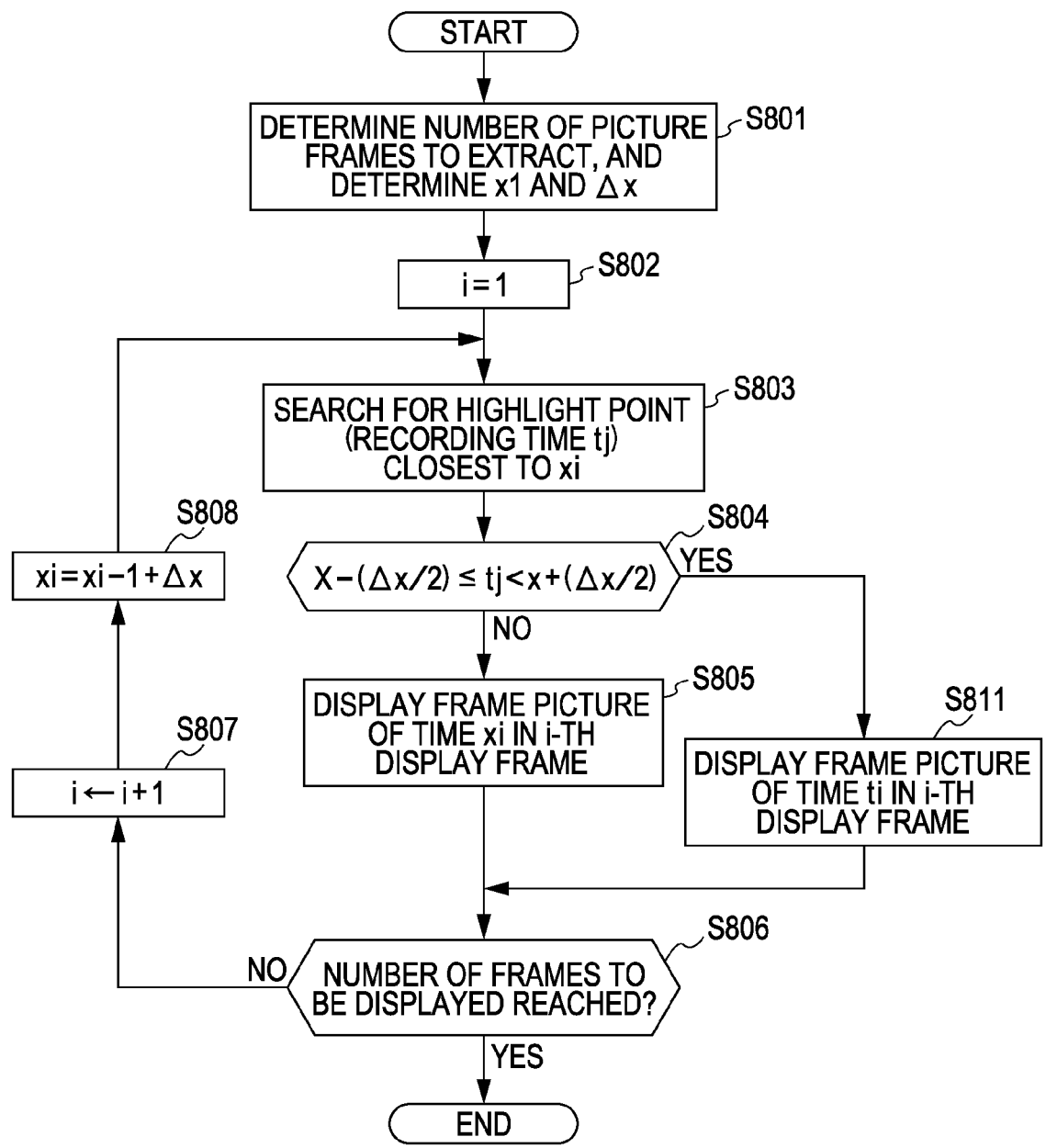

INFORMATION PROCESSING APPARATUS, IMAGING DEVICE, INFORMATION PROCESSING METHOD, AND COMPUTER PROGRAM

CROSS REFERENCES TO RELATED APPLICATIONS

The present invention contains subject matter related to Japanese Patent Application JP 2005-323364 filed in the Japanese Patent Office on Nov. 8, 2005, the entire contents of which are incorporated herein by reference.

BACKGROUND OF THE INVENTION

1. Field of the Invention

The present invention relates to information processing apparatuses, imaging devices, information processing methods, and computer programs. More specifically, the present invention relates to an information processing apparatus, an imaging device, an information processing method, and a computer program that allow selection of representative pictures from captured moving-picture data and display of an array of the selected representative pictures, such as a film-roll display.

2. Description of the Related Art

In a known method of presenting the content of a moving picture captured by a video camera to a user in a readily recognizable manner, frame pictures are selected from the moving picture, for example, at constant intervals, and the frame pictures are arranged in a temporal order so that the frame pictures are displayed like a film roll (hereinafter referred to as a "film-roll display").

With the film-roll display, the user can recognize the content of the moving picture without playing back the moving picture. For example, by displaying a list of frame pictures selected from various moving-picture data files captured in the past, the user can efficiently check captured pictures. Also, it is possible to display representative pictures selected from picture data that is being played back, as a film-roll display in a lower part of the screen, the representative pictures being displayed as superposed on the picture that is being played back, so that the user can select a still picture in the film-roll display to specify a playback position. In an ordinary film-roll display, an array of thumbnail pictures (reduced pictures) is displayed. Such a method of displaying pictures is described, for example, in Japanese Unexamined Patent Application Publication No. 2-32473.

However, particularly in devices having only small screens, such as video cameras or digital cameras, it is not possible to display an array of a sufficient number of pictures. Thus, the number of pictures displayed in a film-roll display is small, so that it is often difficult for the user to grasp the entirety of a moving picture. Also, when representative still pictures are displayed as a film-roll display as superposed on a moving picture that is being played back, as the length of the recorded moving picture becomes longer, it becomes more difficult to display an array of suitable representative pictures. Thus, it becomes difficult for the user to select a suitable playback position.

SUMMARY OF THE INVENTION

It is desired that an information processing apparatus, an imaging device, an information processing method, and a computer program be provided so that when displaying an array of representative pictures selected from captured moving-picture data, for example, in a film-roll display, instead of displaying pictures that are selected at constant time intervals, pictures considered as important scenes in a moving picture are efficiently selected and displayed, thereby facilitating recognition of the content of the moving picture data and allowing specification of a playback position corresponding to an important scene that is presumably highly demanded by a user.

According to an embodiment of the present invention, there is provided an information processing apparatus including a data processor configured to execute processing for selecting a plurality of frame pictures from moving-picture data and for displaying an array of the selected frame pictures. In selecting frame pictures to be displayed, the data processor preferentially selects frame pictures corresponding to highlight points as frame pictures to be displayed, using highlight point information that allows identification of picture portions corresponding to important scenes, the highlight point information being recorded in association with the moving-picture data.

In the information processing apparatus, in selecting frame pictures to be displayed, the data processor may calculate reference times corresponding to a plurality of display frames that are set along a temporal sequence, and for each of the reference times, the data processor may preferentially select a frame picture corresponding to a highlight point having a recording time nearest to the reference time as a frame picture to be displayed.

Also, in the information processing apparatus, in selecting frame pictures to be displayed, the data processor may calculate reference times corresponding to a plurality of display frames that are set along a temporal sequence, and for each of the reference times, the data processor may preferentially select a frame picture corresponding to a highlight point having a recording time nearest to the reference time as a frame picture to be displayed, and when no frame picture corresponding to the highlight point exists in a predetermined threshold time range, the data processor may select a frame picture corresponding to the reference time as a frame picture to be displayed.

Also, in the information processing apparatus, the data processor may obtain recording times of important scenes from highlight point information including the recording times of the important scenes, and for each of the recording times of the important scenes, the data processor may select a frame picture corresponding to a highlight point having the recording time of the important scene as a frame picture to be displayed when the following conditional expression is satisfied:

$$x-(\Delta x/2) \leq t_j < x+(\Delta x/2)$$

where $t_j$ denotes the recording time of the important scene, $x$ denotes a reference time corresponding to a display frame associated with the recording time of the important scene among a plurality of display frames that are set along a temporal sequence, and $\Delta x$ denotes a time interval of the display frames.

According to another embodiment of the present invention, there is provided an imaging device including a recording data processor configured to execute processing for selecting picture portions corresponding to important scenes from captured picture data on the basis of input information that is input during a picture taking period, for generating highlight point information that allows identification of the selected picture portions corresponding to the important scenes, and for recording the highlight point information on a recording medium as information associated with the captured picture data; and a playback data processor configured to execute processing for selecting a plurality of frame pictures from moving-picture data and for displaying an array of the selected frame pictures. In selecting frame pictures to be displayed, the playback data processor preferentially selects frame pictures corresponding to highlight points as frame pictures to be displayed, using the highlight point information recorded in association with the moving-picture data.

In the imaging device, the recording data processor may receive, as the input information, at least one of zoom operation information, detection information of an acceleration sensor, audio signal level information, GPS information, clock information, and still-picture taking information, identifies the picture portions corresponding to the important scenes on the basis of the input information, and generates the highlight point information.

According to another embodiment of the present invention, there is provided an information processing method for executing processing for displaying a picture by an information processing apparatus. The information processing method includes the step of executing data processing for selecting a plurality of frame pictures from moving-picture data and for displaying an array of the selected frame pictures, the data processing being executed by a data processor. In selecting frame pictures to be displayed, frame pictures corresponding to highlight points are preferentially selected as frame pictures to be displayed, using highlight point information that allows identification of picture portions corresponding to important scenes, the highlight point information being recorded in association with the moving-picture data.

In the information processing method, in selecting frame pictures to be displayed, reference times corresponding to a plurality of display frames that are set along a temporal sequence may be calculated, and for each of the reference times, a frame picture corresponding to a highlight point having a recording time nearest to the reference time may be preferentially selected as a frame picture to be displayed.

Also, in the information processing method, in selecting frame pictures to be displayed, reference times corresponding to a plurality of display frames that are set along a temporal sequence may be calculated, and for each of the reference times, a frame picture corresponding to a highlight point having a recording time nearest to the reference time may be preferentially selected as a frame picture to be displayed, and when no frame picture corresponding to the highlight point exists in a predetermined threshold time range, a frame picture corresponding to the reference time may be selected as a frame picture to be displayed.

Also, in the information processing method, recording times of important scenes may be obtained from highlight point information including the recording times of the important scenes, and for each of the recording times of the important scenes, a frame picture corresponding to a highlight point having the recording time of the important scene may be selected as a frame picture to be displayed when the following conditional expression is satisfied:

$$x-(\Delta x/2) \leq tj < x+(\Delta x/2)$$

where tj denotes the recording time of the important scene, x denotes a reference time corresponding to a display frame associated with the recording time of the important scene among a plurality of display frames that are set along a temporal sequence, and $\Delta x$ denotes a time interval of the display frames.

According to another embodiment of the present invention, there is provided an information processing method executed by an imaging device. The information processing method includes the steps of executing recording data processing for selecting picture portions corresponding to important scenes from captured picture data on the basis of input information that is input during a picture taking period, for generating highlight point information that allows identification of the selected picture portions corresponding to the important scenes, and for recording the highlight point information on a recording medium as information associated with the captured picture data, the recording data processing being executed by a recording data processor; and executing playback data processing for selecting a plurality of frame pictures from moving-picture data and for displaying an array of the selected frame pictures, the playback data processing being executed by a playback data processor. In selecting frame pictures to be displayed, frame pictures corresponding to highlight points are preferentially selected as frame pictures to be displayed, using the highlight point information that allows identification of the picture portions corresponding to the important scenes, the highlight point information being recorded in association with the moving-picture data.

In the information processing method, as the input information, at least one of zoom operation information, detection information of an acceleration sensor, audio signal level information, GPS information, clock information, and still-picture taking information is received, the picture portions corresponding to the important scenes are identified on the basis of the input information, and the highlight point information may be generated.

According to another embodiment of the present invention, there is provided a computer program for allowing an information processing apparatus to execute processing for displaying an image. The computer program includes the step of executing data processing for selecting a plurality of frame pictures from moving-picture data and for displaying an array of the selected frame pictures, the data processing being executed by a data processor. In selecting frame pictures to be displayed, frame pictures corresponding to highlight points are preferentially selected as frame pictures to be displayed, using highlight point information that allows identification of picture portions corresponding to important scenes, the highlight point information being recorded in association with the moving-picture data.

According to another embodiment of the present invention, there is provided a computer program for allowing an imaging device to execute information processing. The computer program includes the steps of executing recording data processing for selecting picture portions corresponding to important scenes from captured picture data on the basis of input information that is input during a picture taking period, for generating highlight point information that allows identification of the selected picture portions corresponding to the important scenes, and for recording the highlight point information on a recording medium as information associated with the captured picture data, the recording data processing being executed by a recording data processor; and executing playback data processing for selecting a plurality of frame pictures from moving-picture data and displaying an array of the selected frame pictures, the playback data processing being executed by a playback data processor. In selecting frame pictures to be displayed, frame pictures corresponding to highlight points are preferentially selected as frame pictures to be displayed, using the highlight point information that allows identification of the picture portions corresponding to the important scenes, the highlight point information being recorded in association with the moving-picture data.

Each of the computer programs according to these embodiments can be provided using a storage medium or communication medium for providing the computer program in a computer-readable form to, for example, a general-purpose computer system that is capable of executing various program codes, e.g., a storage medium such as a CD, an FD, or an MO, or a communication medium such as a network. By providing the computer program in a computer-readable form, processing can be executed on the computer system according to the computer program.

Other objects, features, and advantages of the present invention will become apparent from the embodiments of the present invention described below in more detail with reference to the attached drawings. In this specification, a system refers to a logical combination of a plurality of apparatuses, regardless of whether the apparatuses reside within a single case.

According to an embodiment of the present invention, when a plurality of frame pictures are selected from moving-picture data captured by, for example, a digital video camera and an array of the selected frame pictures is displayed, for example, a film-roll display, in selecting frame pictures to be displayed, frame pictures corresponding to highlight points are preferentially selected as frame pictures to be displayed, using highlight point information that allows identification of picture portions corresponding to important scenes, the highlight point information being recorded in association with the moving-picture data. Thus, many pictures presented in the film-roll display represent important scenes. Therefore, a user can efficiently recognize the content of the moving picture and select scenes to be played back.

BRIEF DESCRIPTION OF THE DRAWINGS

FIGS. 10A to 10C are diagrams showing an example of the highlight-point extracting process based on GPS information and an example data structure of highlight point information;

FIGS. 14A and 14B are diagrams showing an example of the highlight-point extracting process based on still-picture taking information and an example data structure of highlight point information based on still-picture taking information;

FIGS. 15A to 15F are diagrams showing pieces of highlight point information obtained by highlight-point extracting processes based on various types of information;

FIG. 17 is a diagram for explaining an example of playback of highlight scenes;

FIG. 18 is a diagram for explaining an example of film-roll display;

FIG. 19 is a diagram for explaining an example of film-roll display; and

FIG. 20 is a flowchart showing the sequence of a film-roll displaying process.

DESCRIPTION OF THE PREFERRED EMBODIMENTS

Now, information processing apparatuses, imaging devices, information processing methods, and computer programs according to embodiments of the present invention will be described in detail with reference to the drawings.

First, an example configuration of an imaging device (digital camera) as an information processing apparatus according to an embodiment of the present invention will be described with reference to FIG. 1.

Figure 1:
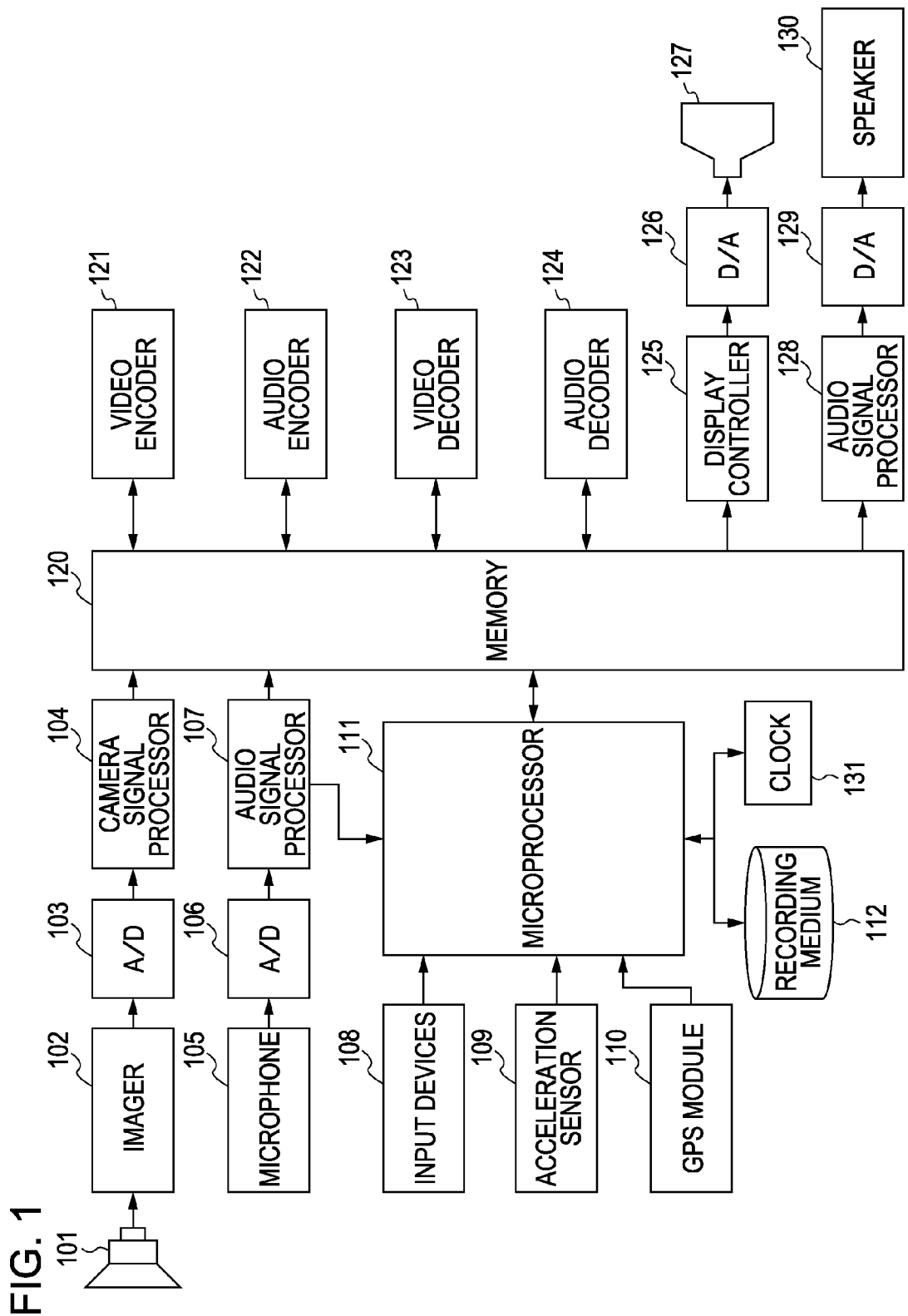
FIG. 1 is a block diagram showing the configuration of an imaging device according to an embodiment of the present invention.

Referring to FIG. 1, the imaging device includes a lens 101, an imager 102 implemented by a solid state imaging device (e.g., CCD) or the like that converts optical signals input via the lens 101 into electric signals, an A/D converter 103 that converts the analog electric signals into digital signals, a camera signal processor 104 that executes signal processing on pictures on the basis of captured video data, a microphone 105 that receives input of audio information, an A/D converter 106 that converts the analog audio signals output from the microphone 105 into digital signals, and an audio signal processor that executes signal processing on sounds on the basis of captured audio data. The audio signal processor 107 inputs audio signal level information to a microprocessor 111. The microprocessor 111 extracts highlight points (pieces of information representing positions of important scenes), for example, on the basis of the audio signal level information input from the audio signal processor 107.

The microprocessor 111 functions as a recording data processor that obtains various types of input information during an imaging period, that selects portions corresponding to important scenes from captured video data, that generates highlight point information that allows identification of the portions corresponding to the important scenes, selected on the basis of the input information, and that records the highlight point information on a recording medium 112 as information associated with the captured video data. The extraction of highlight points will be described later in more detail.

The microprocessor 111 also functions as a playback data processor that plays back and displays captured pictures, that selects pictures to be displayed in a film roll display, and so forth. The film roll display will be described later in more detail.

The video and audio digital data generated by the camera signal processor 104 and the audio signal processor 107 are stored in a memory 120. A video encoder 121 and an audio encoder 122 execute encoding to convert the input video signals and audio signals into data for recording. A video decoder 123 and an audio decoder 124 execute decoding of video and audio signals read from the recording medium 112, for example, when data is read and played back from the recording medium 112 having captured data recorded thereon. The memory 120 temporarily stores data to be encoded or decoded.

The microprocessor 111 controls processing executed in the imaging device. Also, the microprocessor 111 receives information input by a user from input devices 108, such as various switches and buttons. Furthermore, the microprocessor 111 receives sensor detection information from an acceleration sensor 109, receives audio signal level information from the audio signal processor 107, receives position information obtained by a GPS module 110 from GPS satellites, and receives date and time information from a clock 131. Furthermore, the microprocessor 111 controls recording or playback of data on or from the recording medium 112.

The input devices 108 are buttons, switches, or the like that are used when a user operates the imaging device. More specifically, the input devices 108 include, for example, a switch for a zoom operation, a key for taking a moving picture, a shutter key for taking a still picture, and a touch panel. Information that is input via the input devices 108 is transmitted to the microprocessor 111, and the microprocessor 111 exercises control and extracts highlight points on the basis of the information corresponding to user's operations.

The acceleration sensor 109 detects movement of the imaging device, and inputs information representing the result of detection to the microprocessor 111. The GPS module 110 receives data from GPS satellites, and inputs the data to the microprocessor 111. On the basis of this information, the microprocessor 111 can obtain the latitude and longitude of the current position. The clock 131 inputs information representing the current date and time to the microprocessor 111. The microprocessor 111 extracts highlight points on the basis of these pieces of information input from the acceleration sensor 109, the GPS module 110, and the clock 131.

The recording medium 112 is, for example, a non-volatile memory or a hard disk, and the recording medium 112 stores captured video data. A display controller 125 controls monitor display of captured video data, or display of data already captured and recorded on the recording medium 112 and decoded by the video decoder 123. Data generated by the display controller 125 is converted into analog signals by a D/A converter 126, and the analog signals are output to a display 127, such as an LCD panel.

An audio signal processor 128 receives input of audio signals decoded by the audio decoder 124. The decoded audio signals are converted into analog signals by a D/A converter 129, and the analog signals are output to a speaker 130.

The microprocessor 111, which functions as a data processor in the imaging device according to this embodiment, receives input of the following pieces of information:
(1) Information regarding user's operations of the input devices 108
(2) Information regarding results of detection by the acceleration sensor 109
(3) Audio signal level information supplied from the audio signal processor 107
(4) Position information supplied from the GPS module 110
(5) Date and time information supplied from the clock 131

On the basis of these pieces of input information, the microprocessor 111 extracts highlight points (information representing positions of important scenes). The microprocessor 111 receives input of these pieces of information and extracts highlight points on the basis of the input information during an imaging period. The extraction of highlight points will be described below in detail.

First, highlight points will be described. A highlight point is a piece of information that allows identification of a scene that is presumably important in a recorded moving picture. For example, a highlight point is represented in terms of a time elapsed from the beginning of recording of a moving picture (hereinafter referred to as a "recording time"). That is, a highlight point is a piece of information representing a temporal position of a frame including an important scene relative to the beginning of imaging.

In the imaging device according to this embodiment, for example, the following points are detected as highlight points:
A point at which the user performed a zoom operation while taking a picture (represented in terms of a time from the beginning of imaging);
A point at which the user moved the camera (performed a pan or tilt operation) while taking a picture;
A point at which the level of sound input from the microphone reached a peak;
A point at which information representing the latitude or longitude changed, the information being obtained from GPS satellites;
A point corresponding to a specific change in the current time (e.g., a change of the day or a change of the year); and
A point at which the user recorded a still picture while recording a moving picture.

The imaging device according to this embodiment detects these highlight points while recording a moving picture, and records the highlight points as highlight point information associated with captured video data. With the highlight points recorded as described above, when the captured data is played back, it is possible to selectively play back only portions corresponding to the proximities of the highlight points. Thus, it is possible to selectively play back highlight scenes immediately after imaging, without executing particular post processing on captured data, such as image analysis.

Now, the extraction of highlight points by the imaging device according to this embodiment will be described in detail, regarding the following pieces of detected information in order:
(1) Zoom operation information associated with user's operations of the input devices 108
(2) Sensor detection information supplied from the acceleration sensor 109
(3) Audio signal level information supplied from the audio signal processor 107
(4) Position information supplied from the GPS module 110
(5) Date and time information supplied from the clock 131
(6) Still-picture taking information associated with user's operations of the input devices 108
(1) Zoom Operation Information Associated with User's Operations of the Input Devices 108

First, a highlight-point extracting process that is executed by the microprocessor 111 when zoom operation information associated with a user's operation of the input devices 108 is input to the microprocessor 111 will be described in detail with reference to FIG. 2 and FIGS. 3A and 3B.

Figure 2:
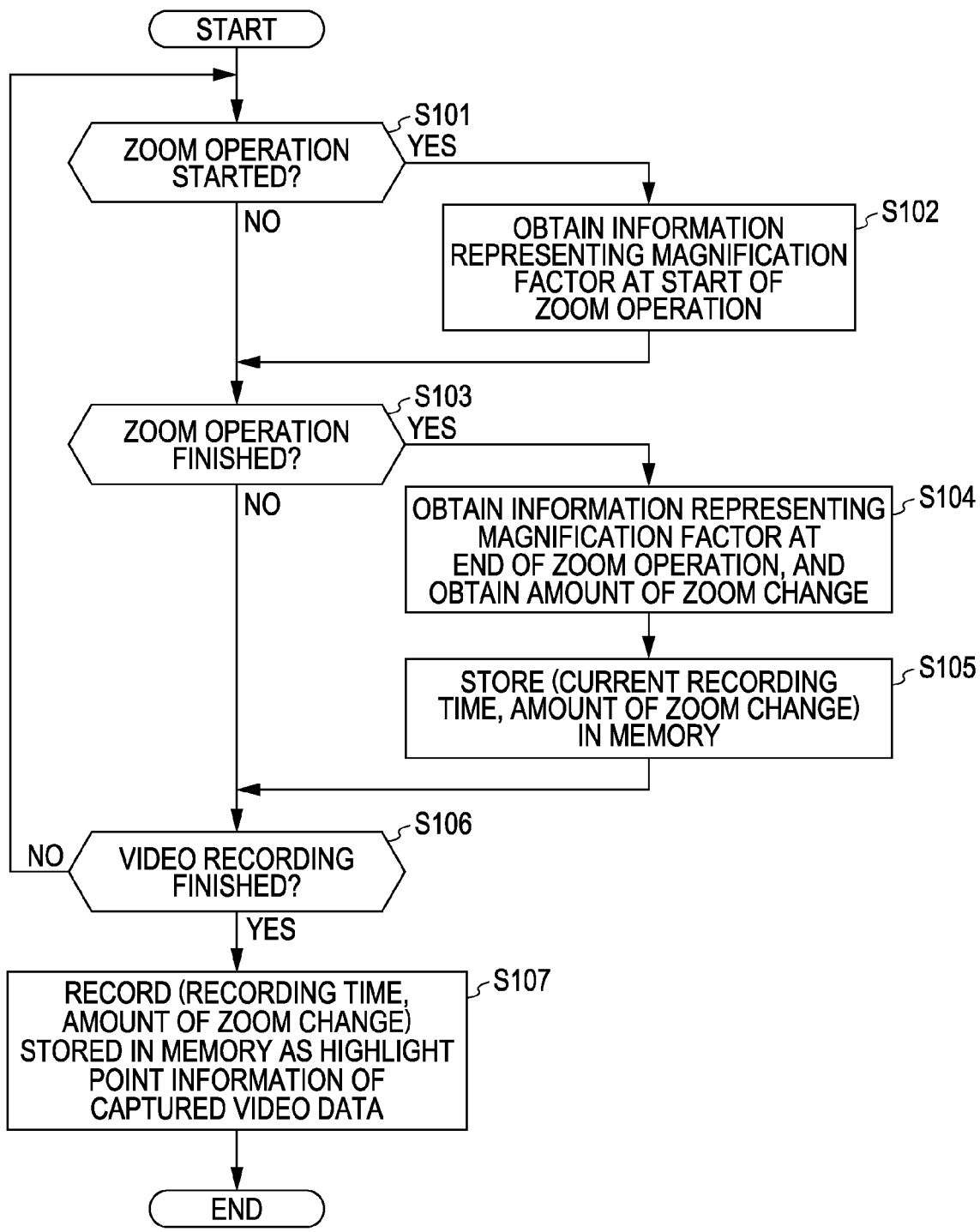
FIG. 2 is a flowchart showing the sequence of a highlight-point extracting process based on zoom operation information.

FIG. 2 is a flowchart showing a sequence of the highlight-point extracting process that is executed during imaging when zoom operation associated with a user's operation of the input devices 108 is input to the microprocessor 111.

While taking a moving picture, a user operates a zoom key, which is one of the input devices 108, to change the zoom ratio. The user's operation is reported from the input devices 108 to the microprocessor 111, and the microprocessor 111 moves the lens 101 to change the zoom ratio. When the user stops the zoom operation, for example, by releasing the zoom key, the microprocessor 111 stops moving the lens 101 and thereby stops the zoom operation.

Now, processing in the individual steps of the processing flow shown in FIG. 2 will be described. When the microprocessor 111 has detected the start of a zoom operation in step S101, the process proceeds to step S102, in which information representing the magnification factor at the start of the zoom operation is obtained.

Then, when the end of the zoom operation is detected in step S103, in step S104, information representing the magnification factor at the end of the zoom operation is obtained. Then, in step S105, a data set of (current recording time, amount of zoom change) is stored on the memory 120.

The amount of zoom change herein refers to, for example, an amount of change in the zoom ratio, and is calculated on the basis of the difference between the zoom ratio at the end of the zoom operation and the zoom ratio at the start of the zoom operation.

Then, in step S106, it is detected whether video recording has been finished. When video recording has not been finished, the process returns to step S101 and is repeated therefrom. Through this repetition, data sets representing the end times of individual zoom operations executed during video recording and the amounts of zoom change in the individual zoom operations, i.e., data sets of (current recording time, amount of zoom change), are sequentially stored on the memory 120.

When it is detected in step S106 that video recording has been finished, in step S107, the data sets of (current recording time, amount of zoom change) stored on the memory 120 are recorded in association with captured data, for example, on the recording medium 112, as highlight information associated with the captured data.

The user typically performs a zoom operation, for example, when the user wishes to zoom in to a subject of imaging or to zoom out to have a wider view. Thus, it can be reasonably presumed that a recording time immediately after a zoom operation is likely to correspond to an important scene, so that the recording time can be considered as a highlight point.

When data sets of (current recording time, amount of zoom change) stored on the memory 120 are recorded on the recording medium 112 as highlight point information associated with captured data at the end of recording of a moving picture, it is possible to record all the information stored on the memory 120 as highlight point information. Alternatively, it is possible to select a predetermined number of data sets having large amounts of zoom change from the information stored on the memory 120 and to record only the selected data sets on the recording medium 112 as highlight point information together with moving-picture data.

Various schemes may be employed for the recording of highlight point information. For example, an area for recording highlight points may be provided in a part of a moving-picture file, or a database file may be provided separately from a moving-picture file so that highlight points can be recorded in the database file.

Now, a specific example of the highlight-point extracting process based on zoom operation information and a specific example of data of highlight point information based on zoom operation information will be described with reference to FIGS. 3A and 3B. FIG. 3A is a diagram showing a history of zoom operations in relation to time elapsed from the beginning (Start) to end (Stop) of taking of a moving picture. FIG. 3B is a diagram showing an example of data of highlight point information associated with captured video data, which is recorded on the recording medium 112 when the zoom operations shown in FIG. 3A are executed.

Figure 3:
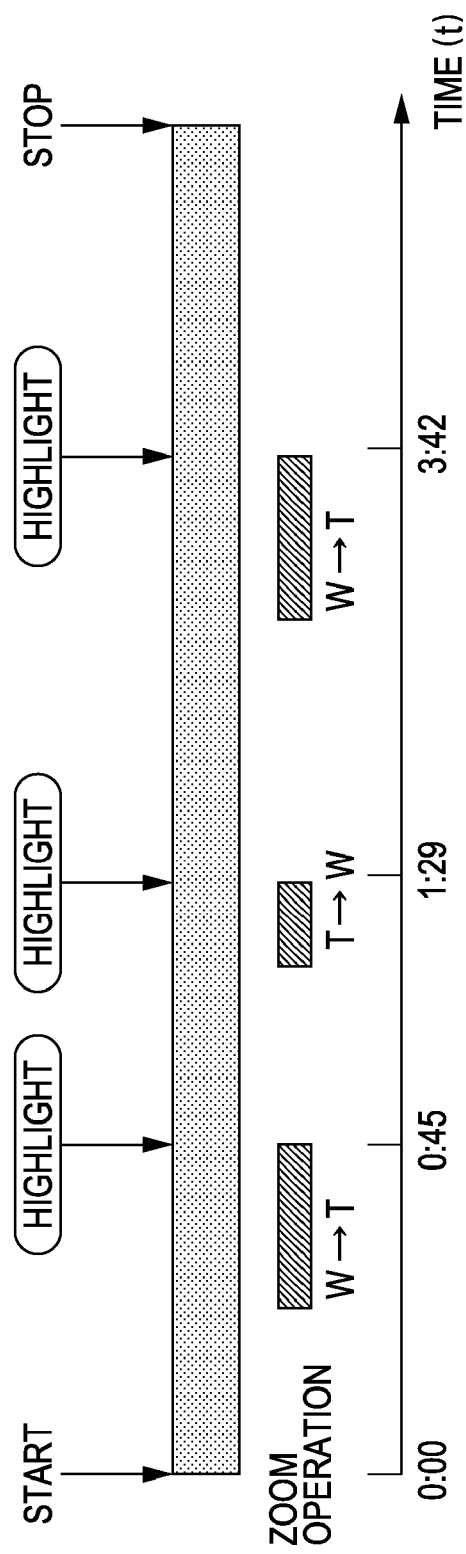
FIGS. 3A and 3B are diagrams showing an example of the highlight-point extracting process based on zoom operation information and an example data structure of highlight point information based on zoom operation information.

In the example shown in FIG. 3A, three zoom operations are executed between the beginning and end of imaging. The first zoom operation is a zoom operation in a direction of wide (W) to telephoto (T), i.e., a zoom in toward a subject of imaging, and the first zoom operation is ended at 0 minutes and 45 seconds after the beginning of imaging. The end time of the zoom operation is recorded as a highlight point. The data recorded corresponds to the first entry data of highlight point information shown in FIG. 3B. That is, a data set of the end time of the zoom operation and the amount of zoom change, i.e., [0:45] and [3.0], is recorded as a first piece of highlight point information.

Similarly, as second and third pieces of highlight point information, data sets of end time and amount of zoom change for the individual zoom operations are recorded. In the example shown in FIG. 3B, the amount of zoom change in the direction of wide (W) to telephoto (T) is represented as a positive value, and the amount of change in the direction of telephoto (T) to wide (W) is represented as a negative value.

(2) Sensor Detection Information Supplied from the Acceleration Sensor 109

Figure 4:
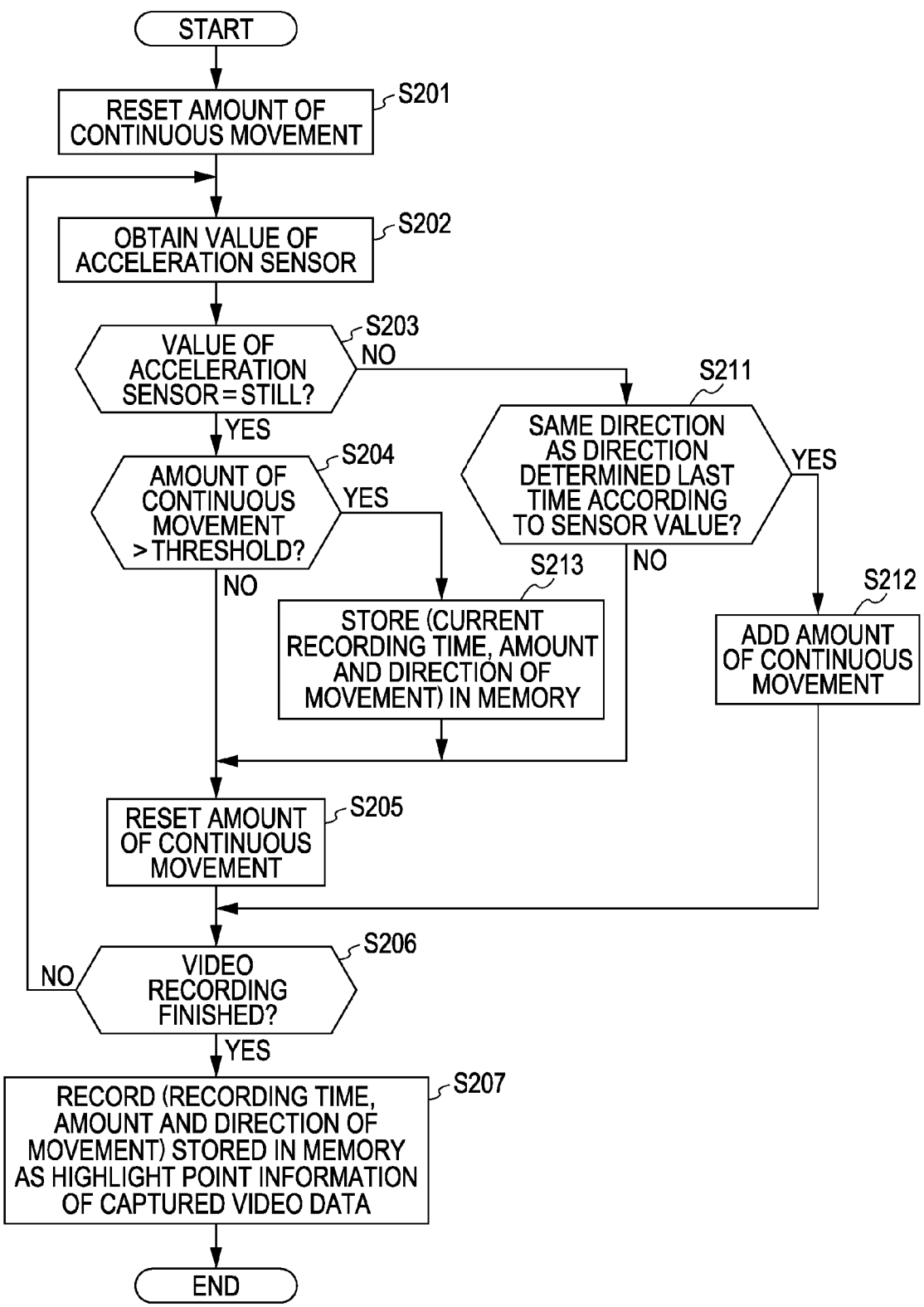
FIG. 4 is a flowchart showing the sequence of a highlight-point extracting process based on acceleration sensor information.

Next, a highlight-point executing process that is executed by the microprocessor 111 when information is input from the acceleration sensor 109 to the microprocessor 111 will be described with reference to FIG. 4 and FIGS. 5A and 5B. In this process, a pan or tilt operation executed during imaging is detected by the microprocessor 111 on the basis of information input from the acceleration sensor 109, and a highlight point is recorded on the basis of this detection.

When the user moves the camera while taking a moving picture, the acceleration sensor 109 detects the movement and reports the movement to the microprocessor 111. When the microprocessor 111 determines that the imaging device is continuously exhibiting movement in the same direction over a certain period on the basis of the information input from the acceleration sensor 109, the microprocessor 111 determines that the user is moving the camera in a certain direction (i.e., executing a pan or tilt operation), and records the current point as a highlight point.

Now, processing executed in the individual steps of the processing flow shown in FIG. 4 will be described. In step S201, as initial setting, the microprocessor 111 resets the amount of continuous movement stored in the memory 120 to [0]. Then, in step S202, a value representing a result of detection is obtained from the acceleration sensor 109. Then, in step S203, the microprocessor 111 checks whether the imaging device is in a still state or a moving state.

When it is determined that the imaging device is in a moving state, the process proceeds to step S211, in which it is determined whether the direction of movement is the same as the direction of movement indicated by information input from the acceleration sensor 109 last time. The input of information from the acceleration sensor 109 is repeated successively. When it is determined that the direction of movement is the same as the direction of movement indicated by information input from the acceleration sensor 109 last time, it is determined likely that a pan or tilt operation is being executed. Then, the amount of movement is calculated on the basis of the information input from the acceleration sensor 109, and the amount of continuous movement stored in the memory 120 is updated. The amount of movement can be obtained by calculating a velocity from acceleration and temporally integrating the velocity.

When it is determined in step S211 that the direction of movement is not the same as the direction of movement indicated by information input from the acceleration sensor 109 last time, it is determined not likely that a pan or tilt operation is being executed. Then, the process proceeds to step S205, in which the amount of continuous movement stored in the memory 120 is reset.

When it is determined in step S203 on the basis of information input from the acceleration sensor 109 that the imaging device is in a still state, the process proceeds to step S204. In step S204, the value representing the amount of continuous movement, stored in the memory 120, is referred to, and it is determined whether the amount of movement is greater than a predetermined threshold distance. When the amount of movement is greater than the predetermined threshold distance, it is determined that a pan or tilt operation has been executed. Then, in step S213, a data set of (current recording time, amount of movement) is stored in the memory 120.

When it is determined in step S204 that the value representing the amount of continuous movement, stored in the memory 120, is not greater than the predetermined threshold distance, it is determined that a pan or tilt operation has not been executed. Then, in step S205, the value representing the amount of continuous movement, stored in the memory 120, is reset to [0].

In step S206, it is determined whether video recording has been finished. When video recording has not been finished, the process returns to step S202 and is repeated therefrom. Through the repetition, data sets of end time of each pan or tilt operation executed during image recording and the amount and direction of movement in the pan or tilt operation, i.e., data sets of (current recording time, amount and direction of movement), are sequentially stored on the memory 120.

When it is detected in step S206 that video recording has been finished, in step S207, the data sets of (current recording time, amount and direction of movement) stored in the memory 120 are recorded, for example, on the recording medium 112 in association with captured data as highlight point information associated with the captured data.

The user typically performs a pan or tilt operation, for example, when the user wishes changes a subject of interest for imaging. Thus, a point immediately after a pan or tilt operation can be reasonably presumed as corresponding to an important scene, so that the point can be considered as a highlight point. For example, when a pan or tilt operation has been finished and the camera has become still, the current recording time and the amount and direction of movement caused by the pan or tilt operation are stored on the memory 120 as highlight information. When the recording of the moving picture has been finished, all the highlight point information that has been stored, or a predetermined number of sets of highlight point information with larger amounts of movement caused by the pan or tilt operations is recorded on the recording medium 112 together with moving-picture data. Similarly to recording of highlight points associated with zoom operations described earlier, various schemes may be employed for the recording of highlight points.

Now, a specific example of the highlight-point extracting process based on pan or tilt information and a specific example of data of highlight point information based on pan or tilt information will be described with reference to FIGS. 5A and 5B. FIG. 5A is a diagram showing a history of pan and tilt operations in relation to time elapsed from the beginning (Start) to end (Stop) of taking of a moving picture. FIG. 5B is a diagram showing an example of data of highlight information associated with captured video data, which is recorded on the recording medium 112 when the pan and tilt operations shown in FIG. 5A are executed.

Figure 5:
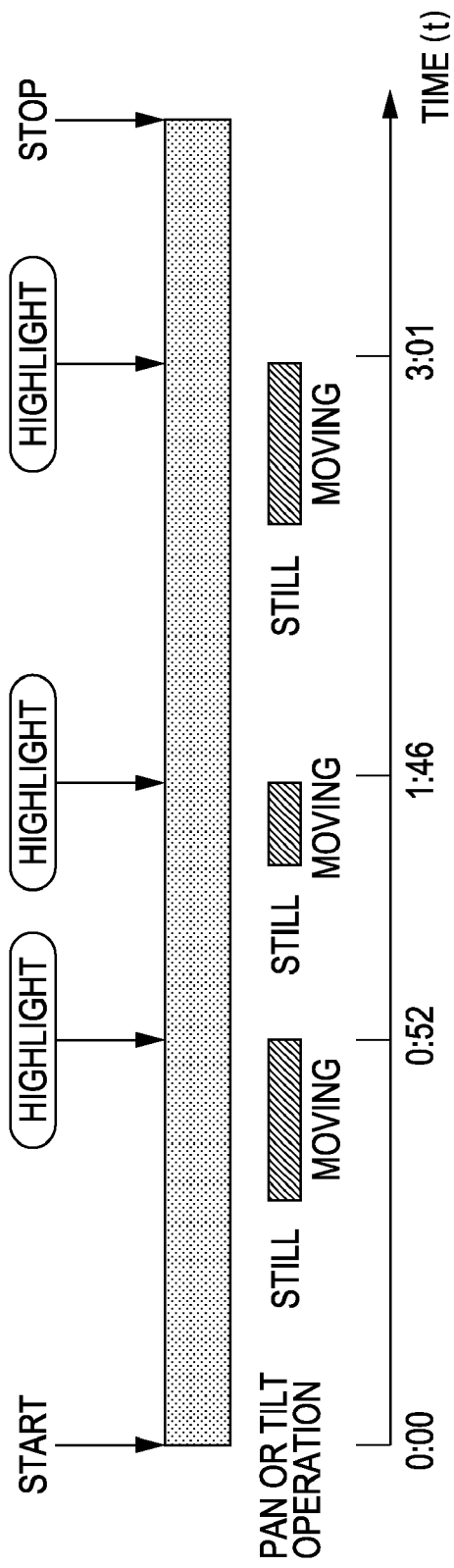
FIGS. 5A and 5B are diagrams showing an example of the highlight-point extracting process based on acceleration sensor information and an example data structure of highlight point information based on acceleration sensor information.

In the example shown in FIG. 5A, three pan or tilt operations are executed between the beginning and end of imaging. The first pan or tilt operation is ended at 0 minutes and 52 seconds after the beginning of imaging. The end time is recorded as a highlight point. The data recorded corresponds to the first entry data of highlight point information shown in FIG. 5B. That is, a data set of the end time of the pan or tilt operation and the amount and direction of movement, i.e., a data set of [0:52] and [5.0], is recorded as a first piece of highlight point information.

Similarly, as the second and third pieces of highlight point information, data sets of the end time and the amount and direction of movement of the individual pan or tilt operations are recorded. In the example shown in FIG. 5B, the amount of movement in the direction of left to right and in the direction of upper to lower is represented by a positive number, and the amount of movement in the opposite directions are represented by a negative number.

In the example described above, the amount of movement associated with a pan or tilt operation is obtained by calculating a velocity from an acceleration input from the acceleration sensor 109 and temporally integrating the velocity. However, even in a device not including an acceleration sensor, it is possible to obtain information regarding camera movement by comparing pictures of adjacent frames included in captured video data. Thus, the configuration may be such that the microprocessor 111 determines whether a pan or tilt operation has been executed on the basis of captured video data.

(3) Audio Signal Level Information Supplied from the Audio Signal Processor 107

Next, a highlight-point extracting process that is executed by the microprocessor 111 when audio signal level information supplied from the audio signal processor 107 is input to the microprocessor 111 will be described in detail with reference to FIG. 6, FIG. 7, and FIGS. 8A and 8B. In this process, audio signal level information based on audio data captured by the microphone 105 during imaging is input to the microprocessor 111, and the microprocessor 111 analyzes change in the audio level on the basis of the input information and records highlight points on the basis of the result of the analysis.

Sound is input via the microphone 105 while taking a moving picture, and audio level information is generated in the audio signal processor 107 and input to the microprocessor 111. The audio level information is also used, for example, for display of an audio level meter on a screen.

On the basis of the audio level information, the microprocessor 111 obtains a time at which the audio level exhibits a peak. The audio level often reaches a peak at an exciting scene. Thus, a peak of the audio level can be considered likely to correspond to an important scene, and therefore can be considered as a highlight point. Various algorithms may be employed to detect a peak, and an example will be described below.

During recording of a moving picture, an audio level is obtained. In the case of a stereo microphone, audio levels for left and right channels can be obtained, so that, for example, an average of the two values is used as the audio level. Furthermore, in order to alleviate the effect of noise, an average audio level over a predetermined past period (e.g., 3 seconds)

is taken. The average value over the predetermined period will be referred to herein as a sample. That is, when the recording of the moving picture has been finished, samples of audio level at predetermined intervals have been obtained. Then, a maximum value and a minimum value of the samples are obtained, and normalization is performed so that the maximum value becomes 10 and the minimum value becomes 0.

Figure 6:
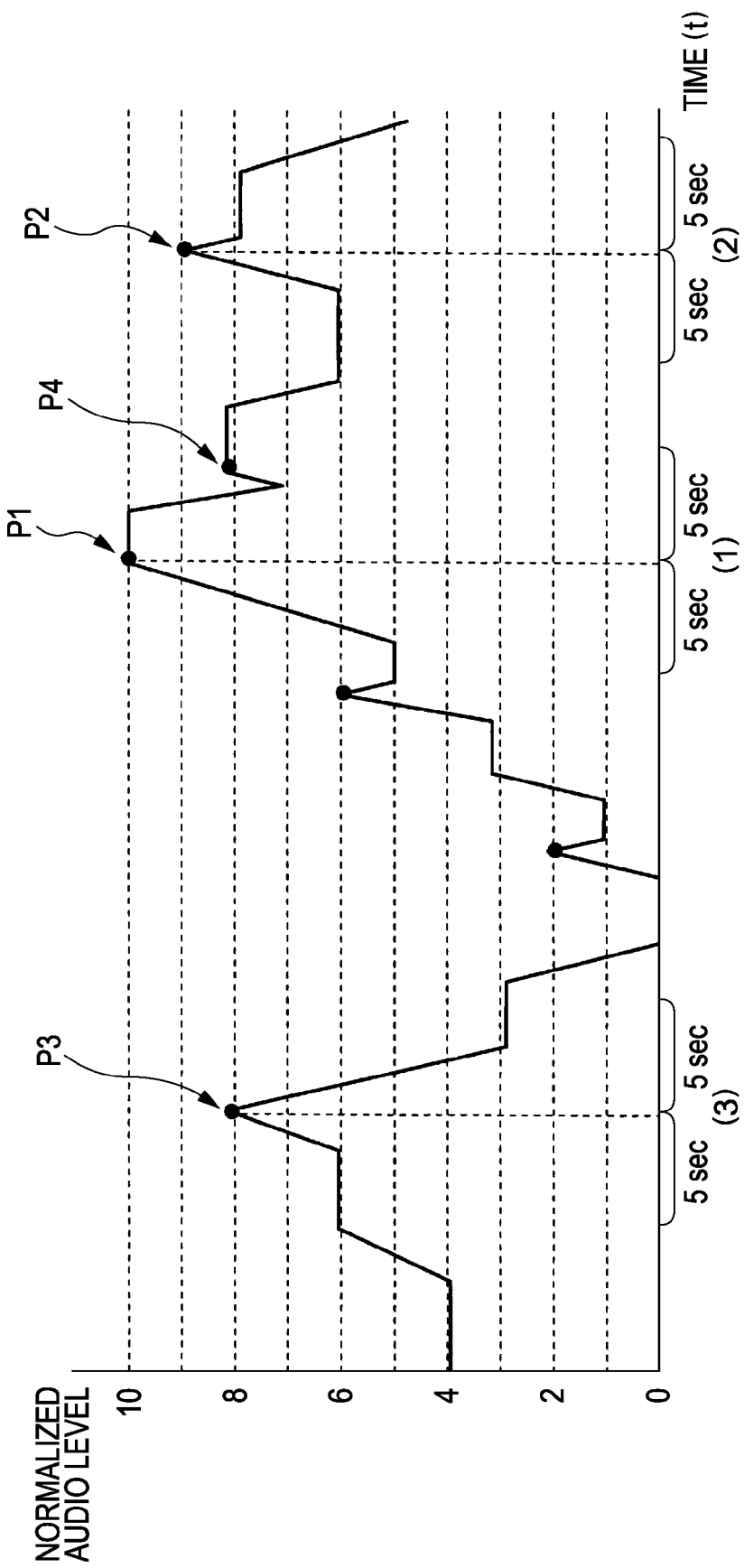
FIG. 6 is a diagram for explaining a highlight-point extracting process based on audio information.

FIG. 6 shows an example of the normalized data. FIG. 6 is a graph in which the horizontal axis represents time and the vertical axis represents normalized value of audio level. As shown in FIG. 6, through normalization, all the samples take on values in a range of 0 to 10. Then, samples making local maximum values are extracted while the other samples are discarded. In FIG. 6, normalized values of audio level forming peaks are indicated by black dots.

Then, samples with audio levels less than a predetermined value (e.g., 8) are also discarded. Then, the remaining samples take on values greater than the predetermined value and also take on local maximum values (peaks). Then, when the selected points include temporally adjacent samples, the sample with a larger value is kept while the other sample is discarded. The samples remaining after these operations are considered as highlight points, and a set of recording time and audio level is recorded for each of the highlight points.

In the example shown in FIG. 6, first, as candidates of highlight points, points having audio levels (normalized values) greater than or equal to the predetermined value (e.g., 8) are selected, namely, points P1 to P4. Then, when the selected points (P1 to P4) include any temporally adjacent samples, a sample with a larger value is kept and the other sample is discarded. When temporal adjacency is defined as a range of ±5 seconds, the selected point P4 exists within the range of temporal adjacency of ±5 seconds with respect to the selected point P1 having a higher level, so that the selected point P4 is excluded from the candidates of highlight points. As a result, only the points P1, P2, and P3 are extracted as highlight points from the data shown in FIG. 6.

Figure 7:
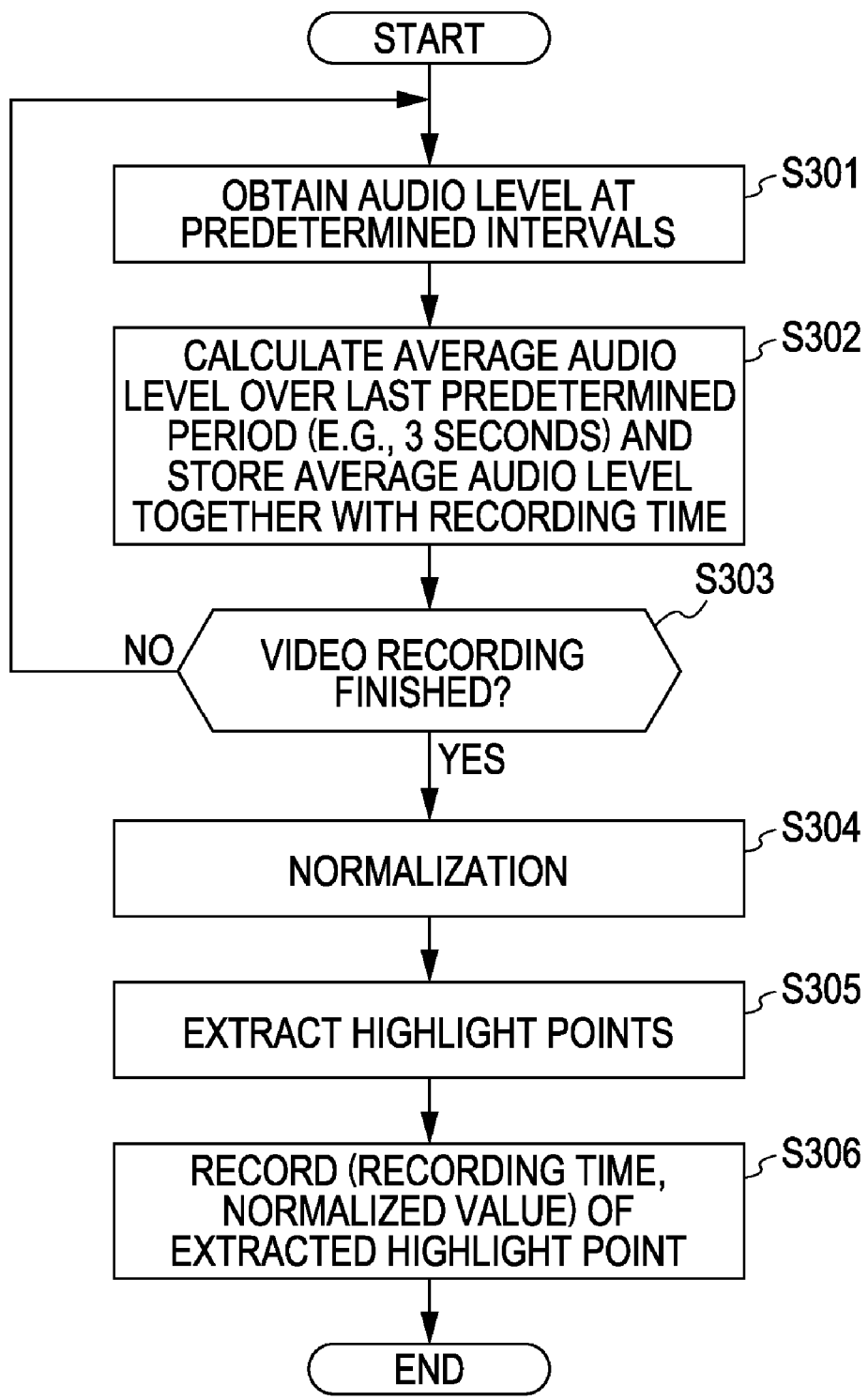
FIG. 7 is a flowchart showing the sequence of the highlight-point extracting process based on audio information.

The processing sequence of the highlight-point extracting process that is executed when audio signal level information is input from the audio signal processor 107 to the microprocessor 111 will be described with reference to a flowchart shown in FIG. 7.

In step S301, the microprocessor 111 obtains audio signal level information from the audio signal processor 107. In step S302, the microprocessor 111 calculates an average audio level over a predetermined past period (e.g., 3 seconds), and stores the average audio level on the memory 120 together with a recording time. These steps are repeated until it is determined in step S303 that video recording has been finished. When it is determined in step S303 that video recording has been finished, the process proceeds to step S304.

In step S304, normalization is executed on the basis of the temporal audio level data stored in the memory 120, thereby obtaining, for example, the relationship between time and normalized audio level data shown in FIG. 6. Then, highlight points are extracted in step S305. More specifically,
(a) Points with audio levels (normalized values) greater than or equal to a predetermined value (e.g., 8) are selected.
(b) When the selected points include temporally adjacent samples, a sample having a larger value is kept while the other sample is discarded.

The points remaining after these steps (a) and (b) are selected as highlight points. Then, in step S306, sets of time information and normalized audio level (peak value) for the individual highlight points extracted are recorded, for example, on the recording medium 112 in association with captured data as highlight point information associated with the captured data.

Figure 8:
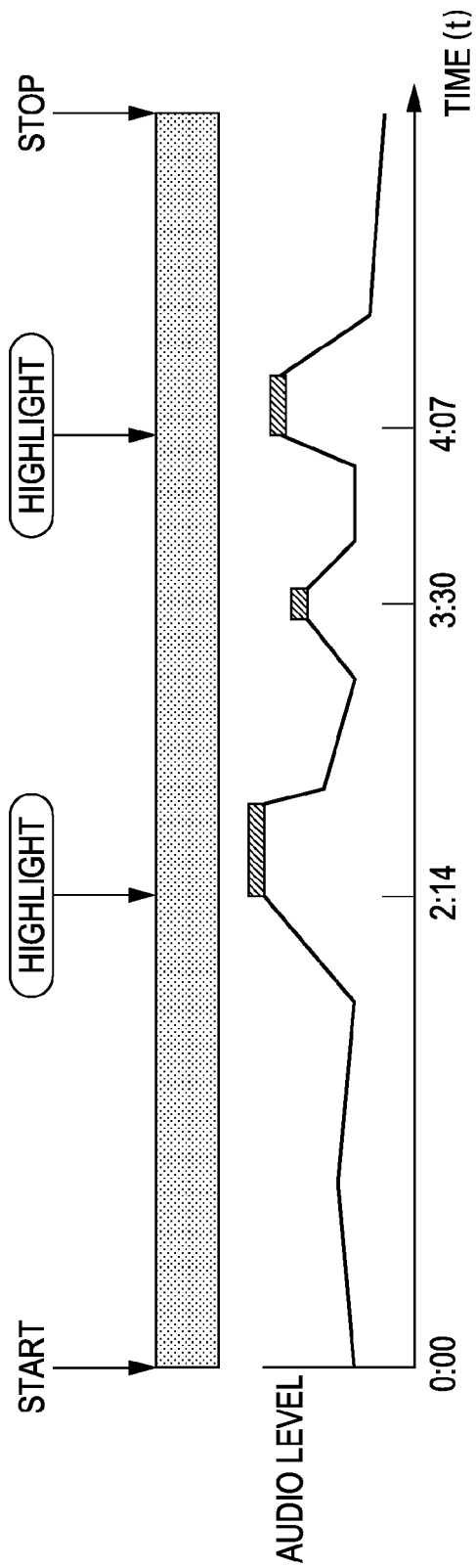
FIGS. 8A and 8B are diagrams showing an example of the highlight-point extracting process based on audio information and an example data structure of highlight point information based on audio information.

A specific example of the highlight-point extracting process based on audio level information and a specific example of data of highlight point information based on audio level information will be described with reference to FIGS. 8A and 8B. FIG. 8A is a diagram showing a history of audio level information in relation to time elapsed from the beginning (Start) to end (Stop) of taking of a moving picture. FIG. 8B is a diagram showing an example of data of highlight point information associated with captured video data, which is recorded on the recording medium 112 when the audio levels shown in FIG. 8A are obtained.

In the example shown in FIG. 8A, three highlight points are obtained from the audio level transition data through the highlight-point extracting process described above. As a result, recording times [2:14], [3:30], and [4:07] are selected as highlight points, as shown in FIG. 8B. Thus, highlight point information including three entries as shown in FIG. 8B, i.e., sets of time information and normalized audio level (peak value) for the individual highlight points, are recorded on the recording medium 112 in association with captured data as highlight point information associated with the captured data.

(4) Position Information Supplied from the GPS Module 110

Next, a highlight-point extracting process that is executed by the microprocessor 111 when position information is input from the GPS module 110 to the microprocessor 111 will be described with reference to FIG. 9 and FIGS. 10A to 10C. In this process, the position of the imaging device is calculated on the basis of information input from the GPS module 110 during imaging, and the microprocessor 111 determines and records highlight points on the basis of changes in the position.

During taking of a moving picture, the microprocessor 111 receives information of GPS satellites from the GPS module 110, so that the microprocessor 111 can obtain the latitude and longitude of the current position in real time. During taking of the moving picture, the microprocessor 111 calculates the distance of movement or the like of the imaging device on the basis of the GPS data.

Since latitude and longitude information calculated on the basis of the GPS data includes a certain degree of error, it is assumed that the device has moved when the position has changed by a distance greater than or equal to a predetermined distance from the position previously observed. When a considerable amount of movement has occurred during imaging, it is presumed that a scene captured immediately after the movement is an important scene and therefore corresponds to a highlight point. Based on this estimation, the microprocessor 111 calculates a distance of movement on the basis of change in latitude and longitude according to the information input from the GPS module 110. When a movement with a distance greater than or equal to the predetermined distance has occurred, the microprocessor 111 records a recording time and an amount of movement associated with the movement on the memory 120. When recording of the moving picture has been finished, all the highlight points stored on the memory 120, or a predetermined number of highlight points among the highlight points stored on the memory 120, are recorded on the recording medium 112 together with moving-picture data.

Figure 9:
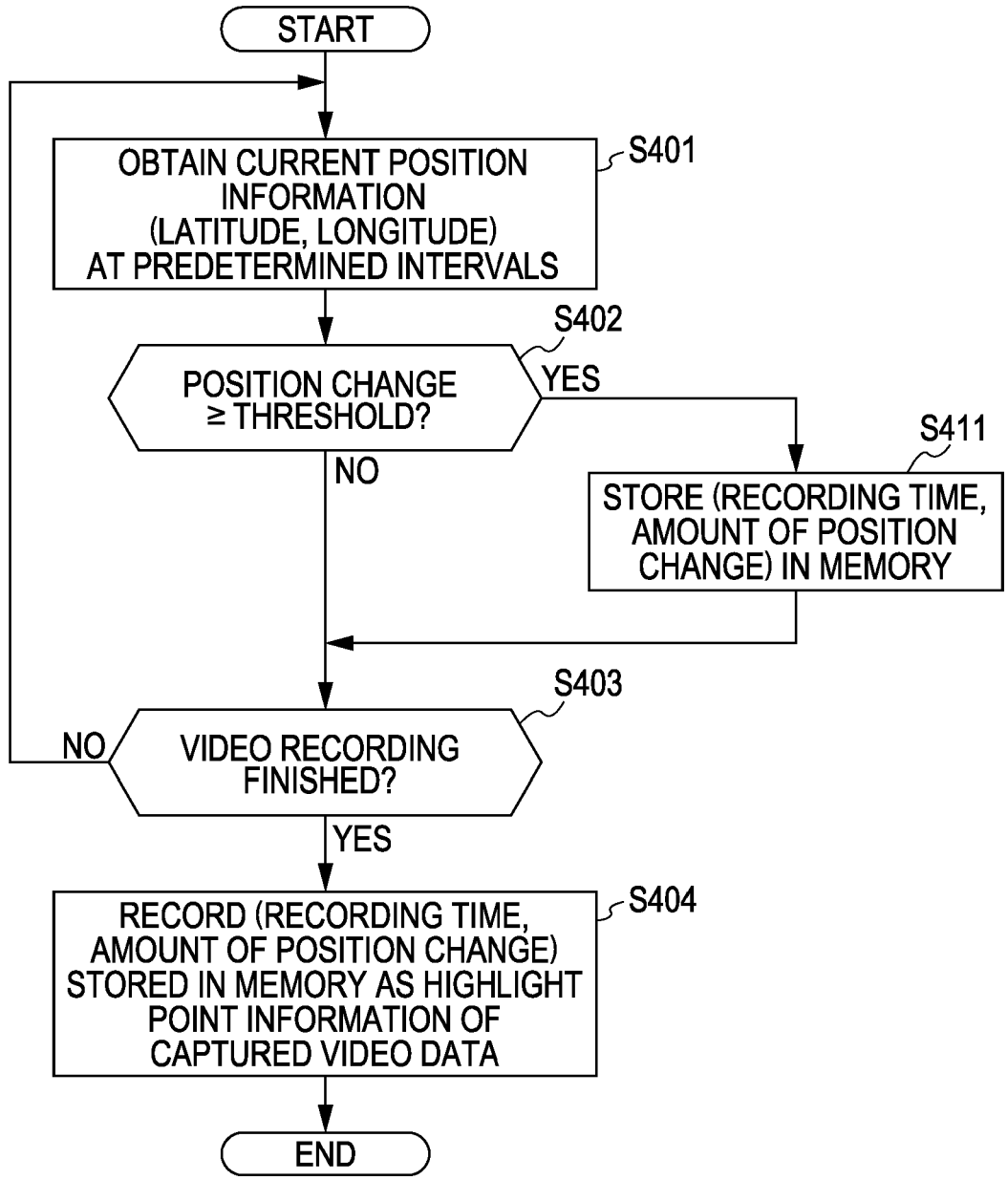
FIG. 9 is a flowchart showing the sequence of a highlight-point extracting process based on GPS information.

Now, processing executed in the individual steps of the processing flow shown in FIG. 9 will be described. In step S401, the microprocessor 111 receives input of information from the GPS module 110, i.e., information representing a latitude and longitude as position information of the imaging device. The position information is repeatedly input at predetermined intervals, and the position information is stored on the memory 120 in association with times of input of the information.

In step S402, the GPS module 110 calculates the difference between the information input from the GPS module 110 and position information that has already been stored on the memory 120, thereby determining whether a movement with a distance greater than or equal to a predetermined threshold distance has occurred. When a movement with a distance greater than or equal to the threshold distance has occurred, the microprocessor 111 determines that a highlight point has been detected. Then, the process proceeds to step S411, in which the microprocessor 111 stores a data set of (current recording time, amount of position change) on the memory 120.

When it is determined in step S402 that a movement with a distance greater than or equal to the predetermined threshold distance has not occurred, or after the data set of (current recording time, amount of position change) has been stored on the memory 120 in step S411, the process proceeds to step S404, in which the microprocessor 111 determines whether video recording has been finished. When video recording has not been finished, the process returns to step S401 and is repeated therefrom. Through this repetition, during image recording, sets of time of occurrence of a movement with a distance greater than or equal to the threshold and amount of position change, i.e., sets of (current recording time, amount of position change), are sequentially stored on the memory 120.

When it is detected in step S403 that video recording has been finished, in step S404, the sets of (current recording time, amount of position change) stored on the memory 120 are recorded, for example, on the recording medium 112 in association with captured data as highlight point information associated with the captured data.

Now, a specific example of the highlight-point extracting process based on GPS information and a specific example of data of highlight point information based on GPS information will be described with reference to FIGS. 10A to 10C. FIG. 10A is a diagram showing times of occurrence of movements with distances greater than or equal to the threshold, measured in terms of time elapsed from the beginning (Start) to end (Stop) of taking of a moving picture, i.e., a diagram showing highlight points. FIG. 10B is a diagram showing the status of position change corresponding to the data shown in FIG. 10A.

Imaging is started at an imaging start point P1 shown in FIG. 10B, and the imaging device starts movement with the user taking a picture by the imaging device. When the imaging device has reached a point P2, it is determined that a movement with a distance greater than or equal to the threshold has occurred, so that the current point in time is determined as a first highlight point. The time associated with this point is 1 minutes and 35 seconds from the beginning of imaging, and this time and the amount of movement are recorded as the first entry of highlight point information shown in FIG. 10C. Furthermore, when the imaging device has moved from the point P2 to a point P3, it is determined that a movement with a distance greater than or equal to the threshold has occurred, so that the current point in time is determined as a second highlight point. The time associated with this point is 2 minutes and 11 seconds after the beginning of imaging, and this time and the amount of movement are recorded as the second entry of highlight information shown in FIG. 10C.

(5) Date and Time Information Supplied from the Clock 131

Figure 11:
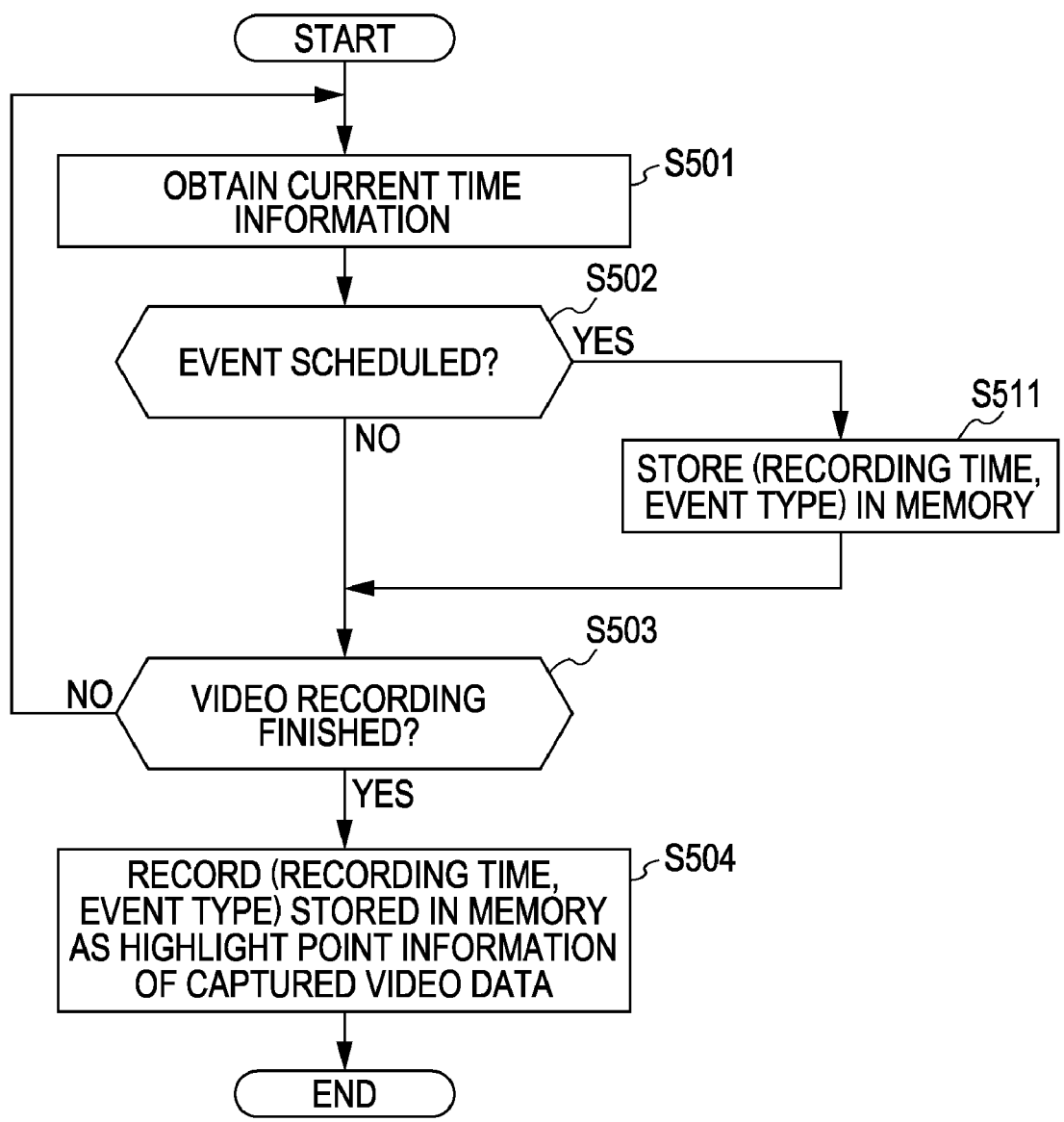
FIG. 11 is a flowchart showing the sequence of a highlight-point extracting process based on clock information.

Next, a highlight-point extracting process that is executed by the microprocessor 111 when date and time information is input from the clock 131 to the microprocessor 111 will be described with reference to FIG. 11 and FIGS. 12A and 12B. In this process, during imaging, date and time information is input from the clock 131 to the microprocessor 111, and the microprocessor 111 detects and records highlight points on the basis of the information representing the current date and time.

During taking of a moving picture, the microprocessor 111 receives input of information representing a current date and time from the clock 131. The current time is measured based on a time specified in advance by the user or set according to GPS satellite information received from the GPS module 110. The microprocessor 111 monitors the clock 131 during taking of a picture, so that the microprocessor 111 can obtain recording time information of a point in time when the date changes, a point in time when the year changes, and so forth.

At a moment when the date changes, the year changes, or the like, it is possible to presume that a certain important event is being held, so that the moment can be considered as a highlight point. In this example, recording times at points when the date changes or the year changes during imaging are considered as highlight points.

Now, the sequence of a highlight-point detecting and recording process executed by the microprocessor 111 on the basis of date and time information supplied from the clock 131 will be described with reference to a flowchart shown in FIG. 11. In step S501, the microprocessor 111 receives input of date and time information from the clock 131. In step S502, the microprocessor 111 determines whether the date and time information corresponds to a date and time of an event. The date and time of an event is determined on the basis of, for example, data that is set in advance by a user. Furthermore, points of date changes, year changes, and so forth may be defined as event dates and times by default.

When it is determined in step S502 that the date and time information corresponds to an event date and time, it is determined that a highlight point has been detected. Then, in step S511, a data set of (current recording time, event type) is stored on the memory 120. The event type indicates, for example, a date change or a year change.

When it is determined in step S502 that the date and time information does not correspond to any event date and time, or after the data set of (current recording time, event type) has been stored on the memory 120, in step S503, the microprocessor 111 determines whether video recording has been finished. When video recording has not been finished, the process returns to step S501 and is repeated therefrom. Through this repetition, sets of time of occurrence of an event during image recording and information representing an event type, i.e., sets of (current recording time, event type), are sequentially stored on the memory 120.

When it is detected in step S503 that video recording has been finished, in step S504, the microprocessor 111 records the sets of (current recording time, event type) stored on the memory 120, for example, on the recording medium 112 in association with captured data as highlight point information associated with the captured data.

Now, a specific example of the highlight-point extracting processed based on clock information and a specific example of highlight point information based on clock information will be described with reference to FIGS. 12A and 12B. FIG. 12A is a diagram showing points in time where occurrences of evens are detected on the basis of clock information along time elapsed from the beginning (Start) to end (Stop) of taking of a moving picture. FIG. 12B is a diagram showing an example of data of highlight point information recorded on the recording medium 112 in association with captured data shown in FIG. 12A.

Figure 12:
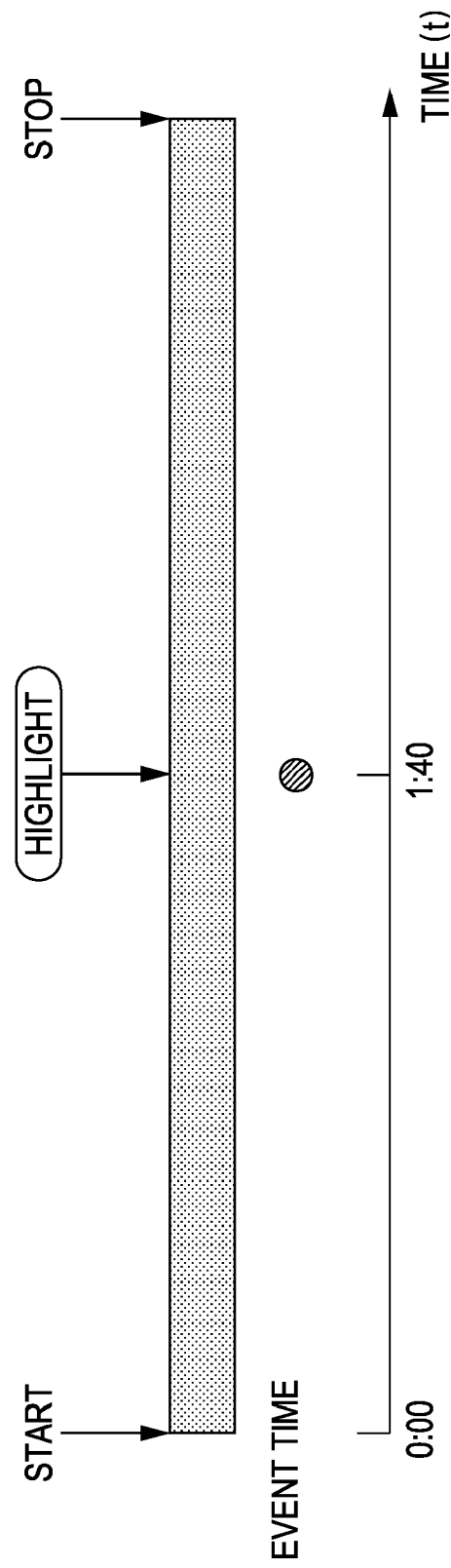
FIGS. 12A and 12B are diagrams showing an example of the highlight-point extracting process based on clock information and an example data structure of highlight point information based on clock information.

In the example shown in FIG. 12A, one event occurrence time, e.g., a time of year change, is included between the beginning and end of imaging, and this point is recorded as a highlight point. The data recorded corresponds to entry data of highlight point information shown in FIG. 12B. More specifically, a data set of a recording time from the beginning of imaging corresponding to the time of the year change, i.e., [1:40], and event type, i.e., [year change], is recorded as highlight point information.

(6) Still-Picture Taking Information Associated with User's Operations of the Input Devices 108

Next, a highlight-point extracting process that is executed by the microprocessor 111 when still-picture taking information associated with a user's operation of the input devices 108 is input to the microprocessor 111 will be described with reference to FIG. 13 and FIGS. 14A and 14B.

Figure 13:
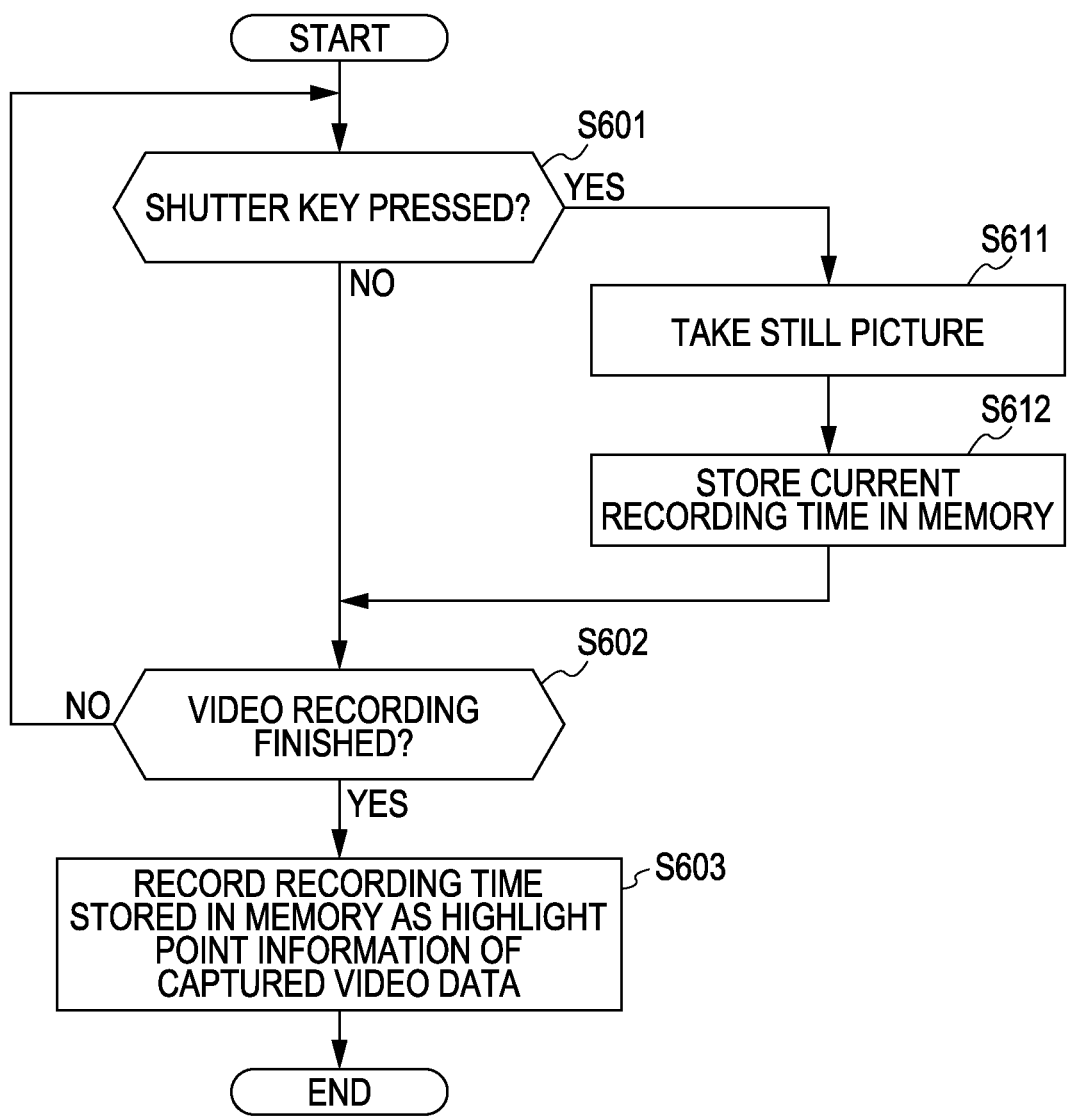
FIG. 13 is a flowchart showing the sequence of a highlight-point extracting process based on still-picture taking information.

FIG. 13 is a flowchart showing the processing sequence of a highlight-point extracting process that is executed by the microprocessor 111 during imaging when still-picture taking information associated with a user's operation of the input devices 108 is input to the microprocessor 111.

The user can take a still picture by pressing a still picture key (e.g., a shutter key), which is one of the input devices 108, while taking a moving picture. The user's operation is reported from the input devices 108 to the microprocessor 111, and the microprocessor 111 controls the camera to take a still picture. When the user takes a still picture while taking a moving picture, it is presumed that the user considers the scene as important, so that the still picture can be considered as corresponding to a highlight point. In this example, a recording time corresponding to a time of taking a still picture is recorded as a highlight point.

Now, processing executed in the individual steps of the processing flow shown in FIG. 13 will be described. When the microprocessor 111 detects a shutter key operation for taking a still picture in step S601, the process proceeds to step S611, in which a still picture is taken. Then, in step S612, information representing the time of taking the still picture is stored on the memory 120.

Then, in step S602, it is detected whether video recording has been finished. When video recording has not been finished, the process returns to step S601 and is repeated therefrom. Through this repetition, data of times of taking still pictures during video recording is sequentially stored on the memory 120.

When it is detected in step S602 that video recording has been finished, in step S603, the data (recording times of taking still pictures) stored on the memory 120 is recorded on the recording medium 112 in association with captured data as highlight information associated with the captured data.

Now, a specific example of the highlight-point extracting process based on still-picture taking information and a specific example of data of highlight point information based on still-picture taking information will be described with reference to FIGS. 14A and 14B. FIG. 14A shows a history of captured still pictures along time elapsed from the beginning (Start) to end (Stop) of taking of a moving picture. FIG. 14B shows an example of data of highlight points information associated with captured video data, recorded on the recording medium 112 when still pictures are taken as shown in FIG. 14A.

In the example shown in FIG. 14A, still pictures are taken twice between the beginning and end of imaging. The first still picture is taken at 2 minutes and 22 seconds after the beginning of imaging. The time of taking the still picture is recorded as a highlight point. The data recorded corresponds to the first entry data of highlight point information shown in FIG. 14B, and the time of taking the still picture, i.e., [2:22], is recorded as a first piece of highlight point information. Similarly, second and third pieces of highlight point information are sequentially recorded.

Overall Processing Sequence

As described above, the imaging device according to this embodiment extracts highlight points on the basis of the following pieces of information:

(1) Zoom operation information associated with user's operations of the input devices 108
(2) Sensor detection information supplied from the acceleration sensor 109
(3) Audio signal level information supplied from the audio signal processor 107
(4) Position information supplied from the GPS module 110
(5) Date and time information supplied from the clock 131
(6) Still-picture taking information associated with user's operations of the input devices 108

These processes can be executed simultaneously on a single moving picture. In this case, highlight point information is generated on the basis of these various types of information and is recorded in association with captured video data. The highlight point information recorded is, for example, data shown in FIGS. 15A to 15F.

FIGS. 15A to 15F show highlight point information extracted an recorded by the microprocessor 111 on the basis of the following pieces of information (1) to (6), respectively:

(1) Zoom operation information associated with user's operations of the input devices 108
(2) Sensor detection information supplied from the acceleration sensor 109
(3) Audio signal level information supplied from the audio signal processor 107
(4) Position information supplied from the GPS module 110
(5) Date and time information supplied from the clock 131
(6) Still-picture taking information associated with user's operations of the input devices 108

In the imaging device according to this embodiment, pieces of highlight point information generated on the basis of these pieces of information is recorded on a recording medium, together with priority levels assigned to the individual pieces of highlight point information in accordance with the types of input information used to generate the pieces of highlight point information. The priority levels are used to selectively play back only highlight scenes.

Now, a procedure of selectively playing back only highlight scenes of captured video data using highlight point information recorded in association with the captured video data will be described. The imaging device according to this embodiment is capable of playing back a captured moving picture on the display 127, and selectively playing back scenes corresponding to highlight points using highlight point information recorded in association with the captured moving picture.

When playing back highlight scenes, for example, a user selects a single moving picture and play back only highlight scenes thereof, or highlight scenes of a certain number of moving pictures are played back in the form of a slide show.

When playing back highlight scenes, it is possible to select and play back all the large number of highlight scenes corresponding to the highlight points shown in FIGS. 15A to 15F. For example, on the basis of the recording times included in the respective pieces of highlight information shown in FIGS.

15A to 15F, it is possible to playback highlight scenes using the recording times as indices, in accordance with setting such as preceding 10 seconds and succeeding 10 seconds or preceding 5 seconds and succeeding 20 seconds with respect to the captured picture frame corresponding to each recording time.

Instead of selecting and playing back all the scenes corresponding to the large number of highlight points shown in FIGS. 15A to 15F, it is possible to select highlight points with higher priority levels on the basis of the priority levels assigned to the highlight points and to play back only the scenes corresponding to the selected highlight points.

Now, the priority levels of highlight points will be described. As described earlier, highlight points are extracted on the basis of various types of information, such as zoom operations, pan or tilt operations, peaks of audio level, changes in position based on GPS information, changes in date or year based on time information, and information regarding still pictures captured while taking a moving picture. Priority levels are assigned to these highlight points according to the types of information used to extract the highlight points. The priority levels can be assigned arbitrarily by the user.

For example, when the user considers that highlight points associated with zoom operations, peaks of audio level, and still pictures captured while taking a moving picture are more likely to correspond to important scenes while highlight points associated with pan or tilt operations, changes in position based on GPS information, and changes in date or year based on time information are less likely to correspond to important scenes, the user assigns priority levels in the following manner:
Priority level 1: Highlight points extracted on the basis of zoom operations, peaks of audio level, and captured still pictures
Priority level 2: Highlight points extracted on the basis of GPS information and events such as date or year changes
Priority level 3: Highlight points extracted on the basis of pan or tilt operations After setting the priority levels as described above, the number of highlight points to be selected for selective playback of highlight points is determined. In order to play back only highlight scenes of a moving picture, first, a length of highlight playback is determined. The length may be determined in advance as a fixed value (e.g., 20 seconds) or as a fixed ratio to the length of the entire moving picture (e.g., one fifth of the length of the moving picture), or set in advance by the user.

Then, the length of each highlight scene to play back is determined. The length may be determined in advance as a fixed value (e.g., 5 seconds), or the length may be determined on each occasion of playing back a moving picture in the form of a slide show to give certain presentation effect. When BGM is played back in a slide show, the length may be determined for each bar of the music or set by the user in advance. In this manner, the entire length and the length per scene for highlight playback can be determined. These two values can be selected appropriately in accordance with a desired manner of playback. The number of highlight points to be selected can be calculated by dividing the entire length of highlight playback by the length per scene. When the length per scene is variable as in a case where the length is determined in accordance with BGM, the number of highlight points to be selected corresponds to the number of scenes with which the total length of the scenes amounts to the length of the BGM.

Figure 16:
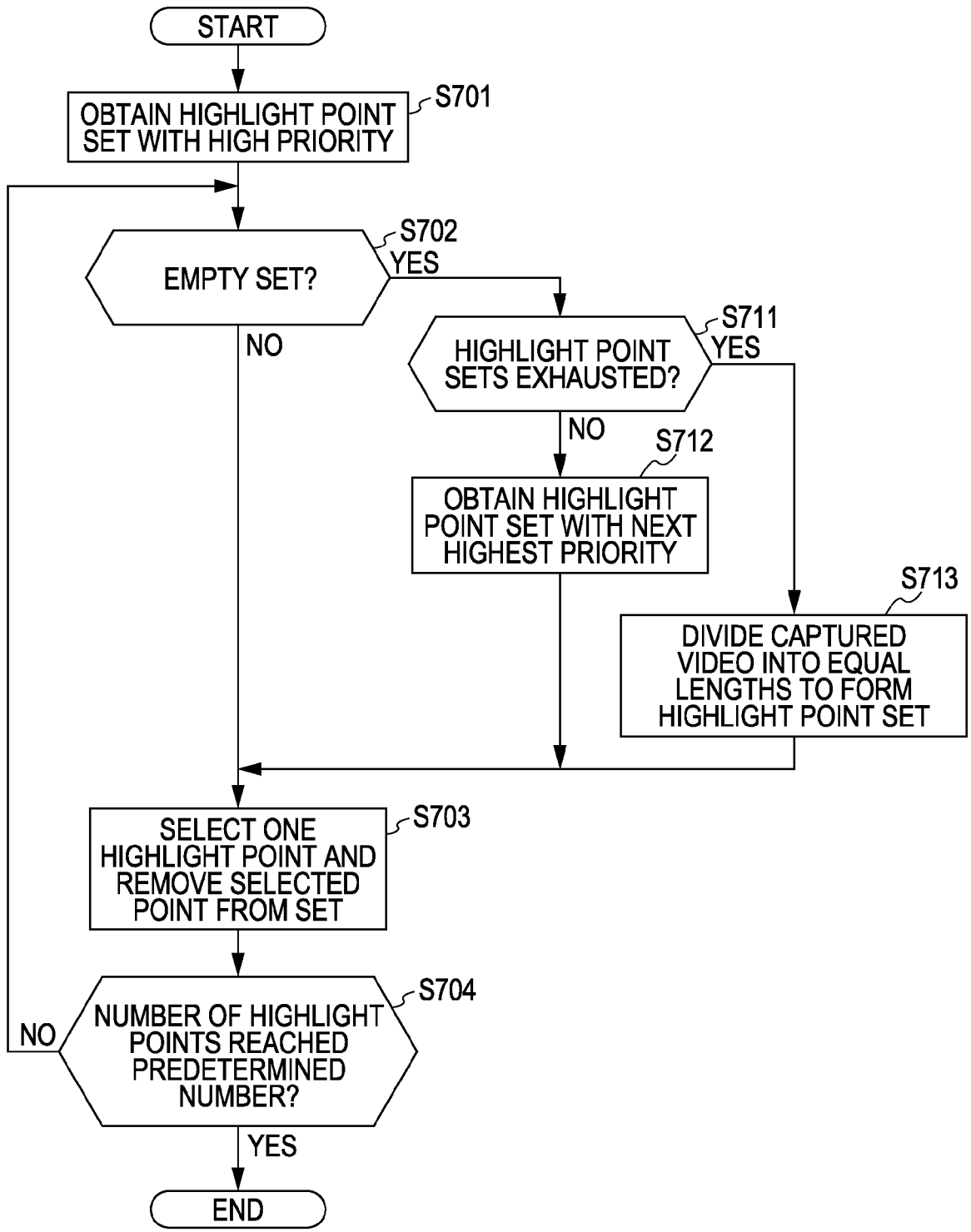
FIG. 16 is a flowchart showing the sequence of a highlight-point selecting process executed to play back highlight scenes.

Next, a procedure of selecting highlight points will be described with reference to a flowchart shown in FIG. 16. In the highlight point selecting process, before playing back highlight points, the microprocessor 111 selects highlight points with higher priority level using highlight point information associated with captured video data.

First, in step S701, a set of highlight points having a highest priority level assigned thereto are selected. In the case of the example of priority level setting described above, a set of the following highlight points are obtained: Priority level 1: Highlight points extracted on the basis of zoom operations, peaks of audio level, and captured still pictures Then, in step S702, it is checked whether the set is empty. When the set is not empty, the process proceeds to step S703, one highlight point is selected from the set. In this selection, when a plurality of highlight points having the same priority level assigned thereto exist, for example, one highlight point may be selected at random. Alternatively, for example, one highlight point may be selected on the basis of an index representing a degree of change, e.g., an amount of zoom change in the case of a zoom operation, an amount of movement in the case of a pan or tilt operation, a value of audio level in the case of audio level, or an amount of position change in the case of latitudinal or longitudinal change based on GPS information.

In step S704, it is checked whether the number of highlight points obtained has reached a predetermined upper limit. When the number of highlight points has not reached the upper limit, the process returns to step S702 and is repeated therefrom. When the set of highlight points with the highest priority level has become empty, the process proceeds to step S711, in which it is checked whether a set of highlight points with a next highest priority level exist. When a set of highlight points with a next highest priority level exists, in step S712, the set of highlight points having the next highest priority level are selected. In the case of the example of priority level setting described above, the following set of highlight points are obtained: Priority level 2: Highlight points extracted on the basis of GPS information or events such as date changes or year changes Then, in step S703, one highlight point is selected from the selected set. These steps are repeated until the number of highlight points selected sequentially from those with higher priority levels reaches a predetermined number or until all the highlight points are extracted.

When it is determined in step S711 that no set of highlight points to be selected exists, in step S713, the captured picture is divided into segments (e.g., 10 segments) with equal lengths, and the resulting points are considered as a set of highlight points. Then, the process returns to step S703, in which a highlight point is selected on the basis of the new set. The selection is executed according to a predetermined rule; for example, highlight points formed by dividing the moving picture equally are selected in order from the beginning.

Finally, the highlight point selecting process is ended when it is determined in step S704 that the number of highlight points has reached a predetermined number. By repeating selection in order of priority level as described above, a predetermined number of highlight points are selected.

Next, a procedure of playing back highlights of a moving picture on the basis of selected highlight points will be described. First, selected highlight points are arranged in order of imaging time. Then, a scene of moving picture associated with each highlight point is played back for the length per scene, starting from a little before the highlight point. For example, when the length per scene is 5 seconds, the scene of moving picture is played back for 5 seconds starting from 1 second before the highlight point. This rule is applied sequentially to all the highlight points, whereby only highlight scenes of the moving picture are played back. FIG. 17 shows an example of selective playback of highlight scenes.

FIG. 17 shows an example where three highlight points are selected and played back from captured picture data. Highlight scenes 301 to 303 are moving-picture data including highlight points selected by the process described above. For example, setting is made so that a playback scene covers a range from 1 second before a highlight point to 5 seconds after the highlight point. In the example shown in FIG. 17, only three highlight scenes are played back. For example, setting may be made so that an effect of scene change, such as cross fading, is inserted between highlight points.

Film-Roll Displaying Process

Next, a film-roll displaying process that is executed using the highlight point information described above will be described. First, an overview of film-roll display will be described. An example of the film-roll displaying process will be described with reference to FIGS. 18 and 19.

FIG. 18 shows an example where a film-roll display area 502 is superposed on a moving-picture playback screen 501 for playing back a captured moving picture on a display. In the film-roll display area 502, a plurality of representative still pictures selected from the moving-picture data file being played back in the moving-picture playback screen 501 are displayed. By arranging a plurality of frame pictures (thumbnail pictures) in the moving picture in a temporal order at certain appropriate intervals, it is possible to recognize the content of the moving picture and to facilitate selection of a playback position with reference to scenes preceding and succeeding the scene being played back.

FIG. 19 shows an example where representative still pictures of a plurality of captured moving-picture data files are displayed in the form of a film roll. In the example shown in FIG. 19, representative still pictures for four moving-picture data files are displayed in a temporal order in film-roll display areas 601 to 604, respectively.

When a list of captured moving pictures stored on a recording medium within the device is displayed, it is difficult to recognize the content of each moving picture by displaying one representative picture (e.g., a thumbnail of the beginning frame) for the moving picture. In contrast, by displaying a film roll for each moving picture as shown in FIG. 19, it becomes easier to recognize the content of the moving picture, and this facilitates selection of which moving picture to play back.

In an ordinary film-roll display, pictures of individual frames of the moving picture (thumbnail pictures) are used. The thumbnail pictures can be obtained by decoding specific frame pictures selected from the moving picture. Alternatively, frame pictures at predetermined intervals are saved as still pictures (thumbnail pictures) while taking a moving picture so that the still pictures can be used for film-roll display. When thumbnail pictures of arbitrary frames (or frames at predetermined intervals) can be obtained, by arranging the thumbnail images in a display memory and displaying the thumbnail images, the film-roll display shown in FIG. 18 or FIG. 19 can be achieved.

Next, a film-roll displaying process using the highlight point information described earlier will be described. When captured picture data is displayed in the form of a film roll, in order to simultaneously display still-picture frame data selected from picture data from the beginning to end of a moving-picture data file, frames are extracted at such intervals that the entire length of the moving picture is covered and thumbnail images of the extracted frames are displayed.

However, particularly in a device having a limited size of liquid crystal screen, such as a digital camera, the number of thumbnail pictures that can be arranged simultaneously is limited to several pictures (e.g., 5 pictures). For example, in order to cover the length of a 5-minute moving picture by five thumbnail pictures, thumbnail pictures are arranged at 1-minute intervals. However, as the intervals of thumbnail pictures become longer, it becomes more difficult to recognize the content of the moving picture. Furthermore, thumbnail pictures of frames extracted at regular intervals might not contain sufficient information for identifying scenes (e.g., a picture in the middle of a scene change by a camera pan). In that case, even with the film-roll display, it is not possible to determine what the scene is like. In contrast, when executing film-roll display, by selecting frames corresponding to highlight points that are likely to represent important scenes and displaying thumbnail pictures for the frames, selected important scenes are used for the film-roll display. Thus, the film roll display areas can be used more effectively even with a small number of frames displayed.

As described earlier, highlight points are stored on the recording medium 112 as data including identification information representing positions of important scenes. The imaging device according to this embodiment selects pictures to be displayed in film-roll display using the highlight point information.

Now, a sequence of a film-roll displaying process executed by the imaging device according to this embodiment will be described with reference to a flowchart shown in FIG. 20. FIG. 20 shows a flowchart of a process executed by the microprocessor 111 as a data processor, in which a film-roll display of captured moving pictures stored on the recording medium 112 is executed using highlight point information associated with the captured moving pictures.

Before executing steps in the flowchart shown in FIG. 20, first, a moving-picture data file that is to be subjected to a film-roll display is determined, and the number of thumbnail pictures to be displayed in a screen is determined. By dividing the length (recording time) of the moving picture by the number of still pictures used in the film-roll display, the display intervals (time intervals) of still-picture frames used in the film-roll display can be obtained. The number of thumbnails of still-picture frames used for the film-roll display is determined in accordance with the layout of the display screen.

When still pictures used for the film-roll display are not simultaneously displayed in the screen but a function such as scrolling operation is used, the display intervals of frames may be determined arbitrarily. For example, it is possible to display thumbnail pictures of frames at certain predetermined intervals, such as 5-second intervals or 10-second intervals. In this case, since it is not possible to display all the thumbnail pictures simultaneously, film-roll display is executed while changing pictures by scrolling operations or the like.

Now, processing executed in the individual steps of the flowchart shown in FIG. 20 will be described. In step S801, $\Delta x$ representing a frame interval (recording time interval) for film-roll display ($\Delta x > 0$) and x1 representing a reference time (recording time) of a frame that is displayed at the beginning of a film roll are determined.

That is, the recording times of the frames (still pictures) that are to be displayed in the film-roll display can be represented as follows:

First frame: Reference time $x(1)=x(1)$
Second frame: Reference time $x(2)=x(1)+\Delta x$
Third frame: Reference time $x(3)=x(1)+2\Delta x$
i-th frame: Reference time $x(i)=x(1)+(i-1)\Delta x$
where i is a parameter representing the number of a frame that is used in a film-roll display, as counted from the beginning.

In step S802, the parameter i is initialized so that i=1. Then, in step S803, in order to determine a thumbnail picture as a frame picture to be displayed in an i-th display area of the film-roll display, highlight point information recorded in association with the picture data subjected to the film-roll display, e.g., the various types of highlight point information described earlier with reference to FIGS. 15A to 15F, is searched for a time tj of a highlight point that is closest to the reference time x(i).

For example, the various types of highlight point information described earlier with reference to FIGS. 15A to 15F are contained in a single data file, and the recording times tp (p=1, . . . , n) are sorted in order of time, and a highlight point tj that is closest to the reference time x(i) can be determined efficiently by using binary search.

Then, in step S804, it is checked whether the highlight point tj closest to the reference point x(i), determined from the highlight point information, satisfies expression (1) below:

$$x-(\Delta x/2) \leq tj < x+(\Delta x/2) \quad (1)$$

Expression (1) is used to check whether the highlight point tj closest to the reference point x(1), obtained from the highlight point information, is closer to x(i) than the frames preceding and succeeding the reference time x(i) of the i-th picture frame used for the film-roll display, i.e., the reference time x(i−1) of the (i−1)-th picture frame and the reference time x(i+1) of the (i+1)-th picture frame.

When expression (1) is satisfied, the process proceeds to step S811, in which it is determined that the i-th picture frame of the subject of the film-roll display can be replaced with the frame at the time of the highlight point tj, so that the frame at the time of the highlight point tj is used as the i-th picture frame of the subject of the film-roll display. As described above, the picture can be displayed by decoding the moving picture or by using a saved still picture (thumbnail image) of the frame.

When it is determined in step S804 that expression (1) is not satisfied, $$x-(\Delta x/2) \leq tj < x+(\Delta x/2) \quad (1)$$

the process proceeds to step S805. In step S805, considering that the i-th picture frame of the subject of the film-roll display is not replaceable with any highlight point, the frame picture at time x(i) is displayed as the i-th picture frame of the subject of the film-roll display.

Then, in step S806, it is checked whether the number of pictures selected for the film-roll display has reached a predetermined number. When the number of pictures has not reached the predetermined number, in step S807, the parameter i is incremented by 1. Then, in step S808, the reference time (recording time) of the i-th display frame is calculated according to:

$$x(i)=x(i-1)+\Delta x$$

Then, the process returns to step S803 and is repeated therefrom.

This process is repeated until the number of pictures selected for the film-roll display reaches the predetermined number, and the process is ended when it is determined in step S806 that the number of pictures selected for the film-roll displayed has reached the predetermined number.

Through this process, many of the pictures that are to be used in the film-roll display are replaced with pictures corresponding to highlight points selected as important scenes. Thus, the user can efficiently recognize the content of the moving picture and to select scenes to play back. Furthermore, since the pictures selected for the film-roll display are arranged in a temporal order, temporal inconsistencies do not arise.

Next, a procedure of changing the range of film-roll display in accordance with user's operations will be described. As described earlier, the time intervals of frames used for film-roll display may be determined arbitrarily. However, the minimum value of the frame intervals is determined according to a minimum time in which a frame picture can be obtained.

For example, when captured video data is recorded as MPEG data, in a device in which only I pictures of GOPs (Groups of pictures) defined by MPEG are selected as frame pictures used for film-roll display, the minimum value of the intervals of pictures used for film-roll display corresponds to a period of a GOP. The minimum value will be denoted as dmin. The maximum value of a frame period is determined according to the length of the moving picture. For example, the maximum value is obtained by dividing the length of the moving picture by the number of areas for displaying frame pictures. The maximum time will be denoted as dmax.

The frame intervals of pictures displayed in the film-roll display can take on the following values:

dmin, dmin×2, dmin×3, . . . , dmin×k, dmax where k is a natural number and dmin×k<dmax≦dmin×(k+1).

When a film-roll display according to the procedure described above has been going on with the frame time interval $\Delta x=d$, and the film-roll display is to be changed to a film roll display with $\Delta x=dnew$, for example, a film-roll display is executed with the time x1 at the beginning of the film roll maintained as it is and the times x2, . . . , xn calculated by the above procedure using $\Delta x=dnew$.

By the procedure described above, a film-roll display can be presented with various time intervals. Thus, for example, when the user wishes to view a detailed film-roll display at relatively short time intervals, a film roll display with relatively short time intervals is presented accordingly. Conversely, when the user wishes to grasp the content of the whole moving picture at rather rough time intervals, a film-roll display with relatively long time intervals is presented accordingly.

Next, a procedure of playing back a moving picture from a position of a frame in a film-roll display will be described. When a film-roll display is presented in the manner described above, many frame pictures corresponding to highlight points that are likely to represent important scenes exist in the frames of the film-roll display. When the user wishes to play back a scene corresponding to a highlight point with reference to the film-roll display, the user selects the corresponding picture in the film-roll display. The user selects the picture using an input device, for example, by directly selecting the picture using a touch panel, or by placing a cursor on a frame in the film-roll display, moving the cursor using a button for horizontal movement, and pressing a button for starting playback with the cursor placed on a frame of interest. Information representing the selection by the user is input to the microprocessor 111. Then, the microprocessor 111 obtains the highlight point (recording time) corresponding to the selected frame picture from highlight point information, and starts playing back the moving picture from the recording time. Alternatively, the microprocessor 111 starts playback from a point a little before the recording time of the highlight point, thereby playing back a scene in the proximity of the highlight point.

The present invention has been described in detail in the context of specific embodiments. However, obviously, it is possible for those skilled in the art to make modifications or alternatives without departing from the spirit of the present invention. That is, the present invention has been disclosed by way of examples, and the present invention should not be construed as limited to the embodiments. The scope of the present invention should be determined on the basis of the claims.

The series of processes described herein can be executed by hardware, by software, or by combination of hardware and software. When the series of processes is executed by software, a program defining the processing sequences is executed by installing it on a memory of a computer embedded in special hardware or on a general-purpose computer that is capable of executing various processes.

For example, the program may be recorded in a recording medium such as a hard disc or a read-only memory (ROM). Alternatively, the program may be stored (recorded) temporarily or permanently on a removable recording medium such as a flexible disc, a compact disc read-only memory (CD-ROM), a magneto-optical (MO) disc, a digital versatile disc (DVD), a magnetic disc, or a semiconductor memory. Such a removable medium can be provided in the form of what is called package software.

Instead of installing the program from a removable recording medium to a computer, the program may be transferred by wireless from a download site to a computer, or transferred by wire to a computer via a network such as a local area network (LAN) or the Internet, so that the computer can receive the program transferred and install the program on an internal recording medium such as a hard disc.

The various processes described herein need not necessarily be executed sequentially in the orders described, and may be executed in parallel or individually as needed or in accordance with the processing ability of an apparatus that executes the processes. A system in this specification refers to a logical combination of a plurality of apparatuses, regardless of whether the constituent apparatuses are disposed within the same case.

What is claimed is:

1. An information processing apparatus comprising:
a processor configured to execute the functions of: (i) selecting, from moving-picture data, a plurality of frame pictures to be displayed and (ii) causing a display of the selected frame pictures,
wherein,
the selecting function includes selecting frame pictures that correspond to highlight points obtained from highlight point information used to identify picture portions corresponding to important scenes in a recorded moving picture, the highlight point information being recorded together with the moving-picture data, and
the processor selects a frame picture corresponding to a highlight point having a recording time associated with an important scene when the following conditional expression is satisfied:

$x-(\Delta x/2) \leq tj < x+(\Delta x/2)$, where tj denotes the recording time of the highlight point, x denotes a reference time corresponding to a display frame associated with the recording time of the highlight point among a plurality of display frames that are set along a temporal display sequence, and $\Delta x$ denotes a time interval between the display frames.

2. An imaging device comprising:
a recording data processor configured to execute the functions of: (i) determining a plurality of highlight points based on input information detected during a recording period of a moving picture, (ii) using the determined highlight points to generate highlight point information used to identify picture portions corresponding to important scenes in the recorded moving picture, and (iii) recording the highlight point information on a recording medium together with moving-picture data; and
a playback data processor configured to execute the functions of: (i) selecting, from the recorded moving picture data, a plurality of frame pictures to be displayed and (ii) causing a display of the selected frame pictures,
wherein,
the selecting function includes selecting frame pictures that correspond to highlight points selected from the highlight point information, and
the playback data processor selects a frame picture corresponding to a highlight point having a recording time associated with an important scene when the following conditional expression is satisfied:

$x-(\Delta x/2) \leq tj < x+(\Delta x/2)$, where tj denotes the recording time of the highlight point, x denotes a reference time corresponding to a display frame associated with the recording time of the highlight point among a plurality of display frames that are set along a temporal display sequence, and $\Delta x$ denotes a time interval between the display frames.

3. The imaging device according to claim 2, wherein the input information includes at least one of zoom operation information, detection information of an acceleration sensor, audio signal level information, GPS information, clock information, and still-picture taking information.

4. An information processing method, the method comprising:
using a processor to execute the functions of: (i) selecting, from moving-picture data, a plurality of frame pictures to be displayed and (ii) causing a display of the selected frame pictures,
wherein,
the selecting function includes selecting frame pictures that correspond to highlight points selected from highlight point information used to identify picture portions corresponding to important scenes in a recorded moving picture, the highlight point information being recorded together with the moving-picture data, and
a frame picture corresponding to a highlight point having a recording time associated with an important scene is selected when the following conditional expression is satisfied:

$x-(\Delta x/2) \leq tj < x+(\Delta x/2)$, where tj denotes the recording time of the highlight point, x denotes a reference time corresponding to a display frame associated with the recording time of the highlight point among a plurality of display frames that are set along a temporal display sequence, and $\Delta x$ denotes a time interval of the display frames.

5. An information processing method executed by an imaging device, the information processing method comprising:
using one or more processors to execute the functions of:

(i) determining a plurality of highlight points based on input information detected during a recording period of a moving picture,
(ii) using the determined highlight points to generate highlight point information used to identify picture portions corresponding to important scenes in the recorded moving picture,
(iii) recording the highlight point information on a recording medium together with moving-picture data,
(iv) selecting, from the recorded moving picture data, a plurality of frame pictures to be displayed, and
(v) causing a display of the selected frame pictures,
wherein,
the selecting function includes selecting frame pictures that correspond to highlight points selected from the highlight point information, and
a frame picture corresponding to a highlight point having a recording time associated with an important scene is selected when the following conditional expression is satisfied:

$x \times (\Delta x/2) \leq tj < x+(\Delta x/2)$, where tj denotes the recording time of the highlight point, x denotes a reference time corresponding to a display frame associated with the recording time of the highlight point among a plurality of display frames that are set along a temporal display sequence, and $\Delta x$ denotes a time interval of the display frames.

6. The information processing method according to claim 5, wherein the input information includes at least one of zoom operation information, detection information of an acceleration sensor, audio signal level information, GPS information, clock information, and still-picture taking information.

7. The information processing apparatus of claim 1, wherein the highlight point information is generated based on input information detected during a recording period of the moving picture.

8. The information processing apparatus of claim 7, wherein the input information includes at least one of zoom operation information, detection information of an acceleration sensor, audio signal level information, GPS information, clock information, and still-picture taking information.

9. A non-transitory storage medium having stored thereon program instructions that, when executed by a processor, cause the processor to perform the functions of:
selecting, from moving-picture data, a plurality of frame pictures to be displayed; and
causing a display of the selected frame pictures,
wherein,
the selecting function includes selecting frame pictures that correspond to highlight points selected from highlight point information used to identify picture portions corresponding to important scenes in a recorded moving picture, the highlight point information being recorded together with the moving-picture data, and
the processor selects a frame picture corresponding to a highlight point having a recording time associated with an important scene when the following conditional expression is satisfied:

$x-(\Delta x/2) \leq tj < x+(\Delta x/2)$, where tj denotes the recording time of the highlight point, x denotes a reference time corresponding to a display frame associated with the recording time of the highlight point among a plurality of display frames that are set along a temporal display sequence, and $\Delta x$ denotes a time interval between the display frames.

10. The non-transitory storage medium of claim 9, wherein the highlight point information is generated based on input information detected during a recording period of the moving picture.

11. The non-transitory storage medium of claim 10, wherein the input information includes at least one of zoom operation information, detection information of an acceleration sensor, audio signal level information, GPS information, clock information, and still-picture taking information.

12. A non-transitory storage medium having stored thereon program instructions that, when executed by a processor, cause the processor to perform the functions of:
(i) determining a plurality of highlight points based on input information detected during a recording period of a moving picture,
(ii) using the determined highlight points to generate highlight point information used to identify picture portions corresponding to important scenes in the recorded moving picture,
(iii) recording the highlight point information on a recording medium together with moving-picture data,
(iv) selecting, from the recorded moving picture data, a plurality of frame pictures to be displayed, and
(v) causing a display of the selected frame pictures,
wherein,
the selecting function includes selecting frame pictures that correspond to highlight points selected from the highlight point information, and
a frame picture corresponding to a highlight point having a recording time associated with an important scene is selected when the following conditional expression is satisfied:

$x-(\Delta x/2) \leq tj < x+(\Delta x/2)$, where tj denotes the recording time of the highlight point, x denotes a reference time corresponding to a display frame associated with the recording time of the highlight point among a plurality of display frames that are set along a temporal display sequence, and $\Delta x$ denotes a time interval of the display frames.

* * * * *